(12) United States Patent
Nolin et al.

(10) Patent No.: US 10,150,343 B2
(45) Date of Patent: Dec. 11, 2018

(54) SWING ARM FOR A VEHICLE

(71) Applicant: BOMBARDIER RECREATIONAL PRODUCTS INC., Valcourt (CA)

(72) Inventors: Christian Nolin, St-Denis-de-Brompton (CA); Emile Maltais-Larouche, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 212 days.

(21) Appl. No.: 15/100,461

(22) PCT Filed: Nov. 28, 2014

(86) PCT No.: PCT/IB2014/066435
§ 371 (c)(1),
(2) Date: May 31, 2016

(87) PCT Pub. No.: WO2015/079426
PCT Pub. Date: Jun. 4, 2015

(65) Prior Publication Data
US 2016/0368340 A1 Dec. 22, 2016

Related U.S. Application Data

(60) Provisional application No. 61/910,240, filed on Nov. 29, 2013.

(51) Int. Cl.
*B60G 7/00* (2006.01)
*B62K 25/28* (2006.01)
(Continued)

(52) U.S. Cl.
CPC .............. *B60G 7/001* (2013.01); *B62K 5/027* (2013.01); *B62K 25/283* (2013.01); *B62K 25/02* (2013.01)

(58) Field of Classification Search
CPC ...... B60G 7/001; B62K 25/286; B62K 5/027; B62K 25/02
See application file for complete search history.

(56) References Cited

U.S. PATENT DOCUMENTS 1,369,356 A 2/1921 Rigby
4,392,536 A 7/1983 Iwai et al.
(Continued)

FOREIGN PATENT DOCUMENTS

CA 2783408 A1 * 6/2011 ............. B60G 7/001

OTHER PUBLICATIONS

International Search Report with regard to PCT/IB2014/066435 dated Mar. 18, 2015.

*Primary Examiner* — Karen Beck
(74) *Attorney, Agent, or Firm* — BCF LLP

(57) ABSTRACT

A swing arm for a vehicle includes a left member including at least one left tube extending longitudinally and a right member including at least one right tube extending longitudinally. Respective front end portions of the left and right members are adapted to be pivotably connected to a frame of the vehicle. Respective rear end portions of the left and right members are adapted to mount a rear wheel axle. A cross member extends laterally between the left and right members and includes a stamped first portion being rigidly connected to at least one of the left and right members. A stamped second portion of the cross member is rigidly connected to at least the other of the left and right members. The first and second portions are connected to each other and define a space therebetween.

18 Claims, 23 Drawing Sheets

(51) Int. Cl.
*B62K 5/027* (2013.01)
*B62K 25/02* (2006.01)

(56) References Cited

U.S. PATENT DOCUMENTS

| | | | | |
|---|---|---|---|---|
| 4,463,964 | A | * | 8/1984 | Takayanagi ............ B62K 5/027 |
| | | | | 180/215 |
| 5,724,850 | A | * | 3/1998 | Yamagiwa ............. B21K 21/12 |
| | | | | 72/356 |
| 2005/0029772 | A1 | | 2/2005 | Oi |
| 2005/0139434 | A1 | * | 6/2005 | Nakaie ................... B62K 19/30 |
| | | | | 188/71.1 |
| 2008/0156565 | A1 | * | 7/2008 | Aoki .................... B62K 25/283 |
| | | | | 180/227 |
| 2008/0230293 | A1 | * | 9/2008 | Igarashi ................. B62K 11/04 |
| | | | | 180/227 |
| 2010/0207345 | A1 | | 8/2010 | Nakagawa et al. |
| 2017/0233033 | A1 | * | 8/2017 | Suzuki .................. B62K 11/04 |
| | | | | 180/227 |
| 2017/0282998 | A1 | * | 10/2017 | Hiramaru ............. B62K 25/283 |

\* cited by examiner

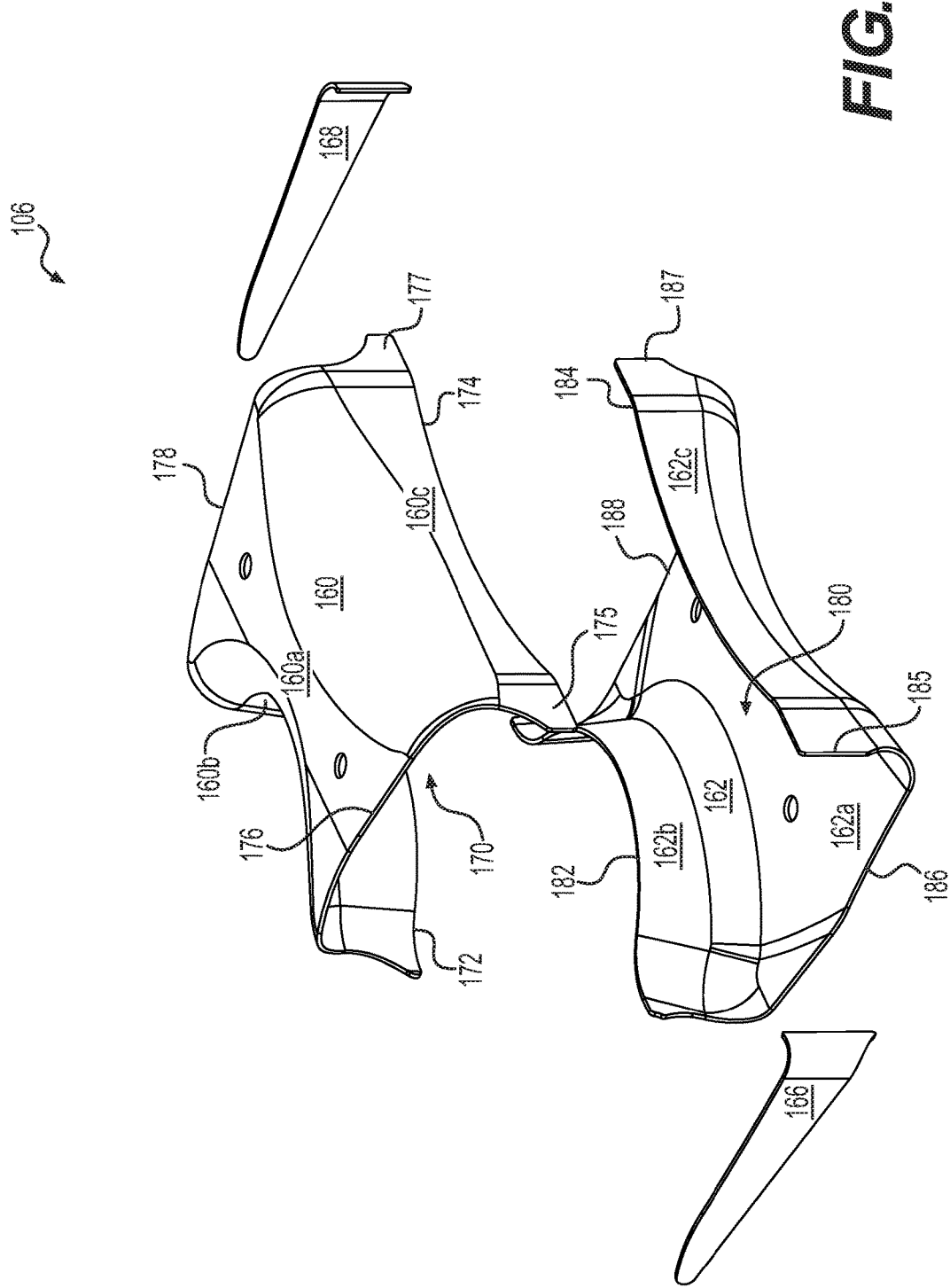

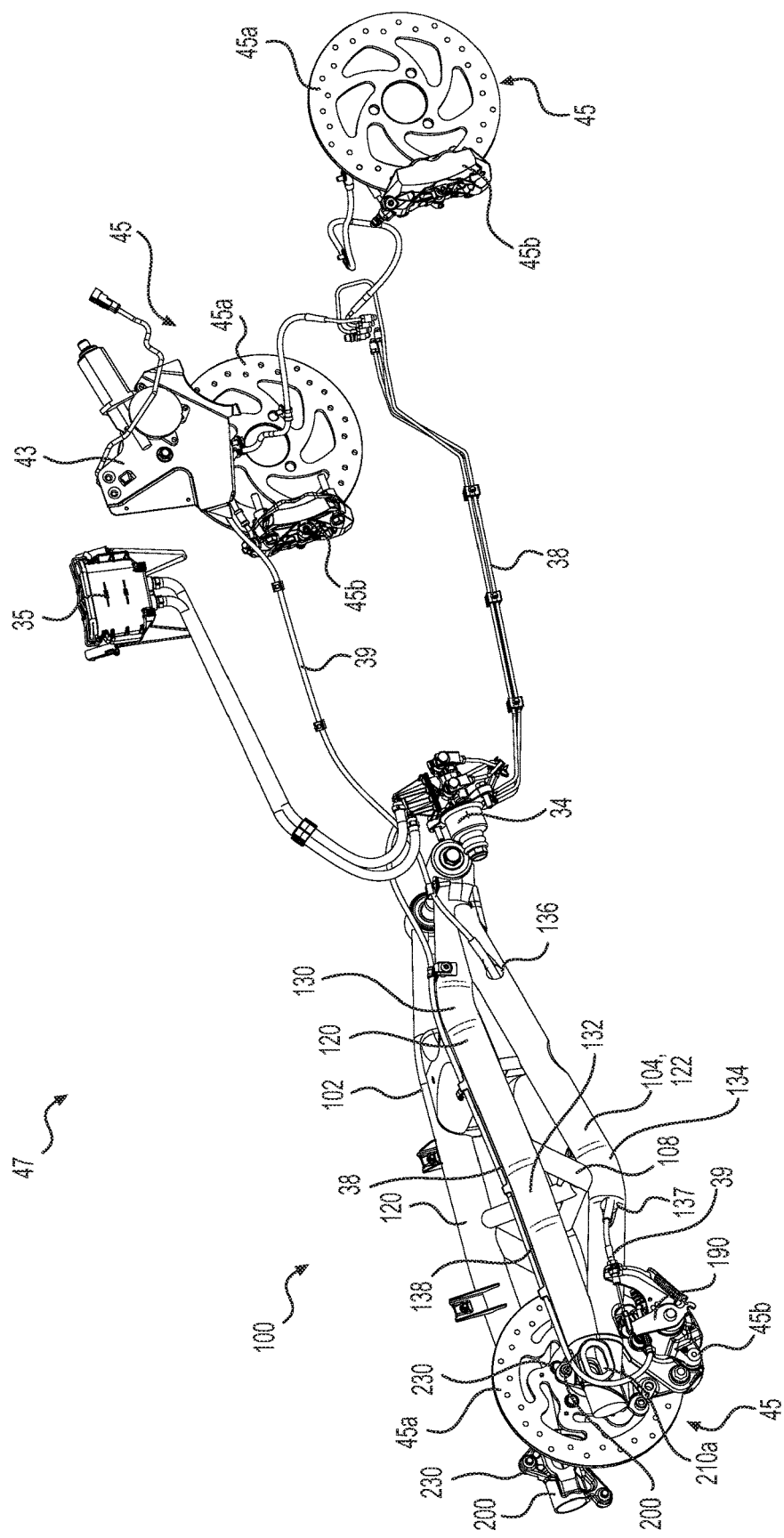

SWING ARM FOR A VEHICLE

CROSS-REFERENCE

The present application claims priority to U.S. Provisional Patent Application No. 61/910,240 filed on Nov. 29, 2013, the entirety of which is incorporated herein by reference.

FIELD OF THE TECHNOLOGY

The present technology relates to swing arms for vehicles.

BACKGROUND

In wheeled straddle-seat vehicles, the rear wheel is typically connected to the vehicle frame by a rear suspension assembly which includes a swing arm and a shock absorber. In certain situations, such as for example, during turns or when one of the wheels of the vehicle experiences a flat tire, the rear suspension assembly is subjected to large lateral, vertical and torsional forces. It is thus desirable to make the rear suspension assembly of straddle-seat vehicles strong, durable and capable of withstanding the lateral, vertical and torsional forces that may be encountered in different situations.

In wheeled straddle-seat vehicles, the rear wheel is typically connected to the engine via a belt-type transmission. The belt-type transmission includes a sprocket mounted to the crankshaft of the engine or a transmission output shaft, another sprocket mounted to the rear wheel, and a drive belt disposed around both sprockets in order to transmit torque from the crankshaft/transmission output shaft to the rear wheel. It is desirable to adjust the separation between the two sprockets in order to maintain a particular tension in the drive belt. Thus, it would be desirable to adjust the position of the rear axle upon which the rear wheel and the rear wheel sprocket are mounted.

SUMMARY

It is an object of the present technology to ameliorate at least some of the inconveniences mentioned above.

In accordance with one aspect of the present technology, there is provided a swing arm for a vehicle including a left member including at least one left tube extending longitudinally and a right member including at least one right tube extending longitudinally. Respective front end portions of the left and right members are adapted to be pivotably connected to a frame of the vehicle. Respective rear end portions of the left and right members are adapted to mount a rear wheel axle. A cross member extends laterally between the left and right members and includes a stamped first portion being rigidly connected to at least one of the left and right members. A stamped second portion of the cross member is rigidly connected to at least the other of the left and right members. The first and second portions are connected to each other and define a space therebetween.

In some implementations, the stamped first portion is an upper portion having a front edge, a rear edge, a left edge connected to the left member and a right edge connected to the right member. The stamped second portion is a lower portion having a front edge, a rear edge, a left edge connected to the left member and a right edge connected to the right member.

In some implementations, the rear edges of the upper and lower portions are connected to each other, and the front edges of the upper and lower portions are connected to each other.

In some implementations, a front portion of the upper portion extends upwardly from the front edge of the lower portion, and a rear portion of the upper portion extends upwardly from the rear edge of the lower portion.

In some implementations, a front portion of the lower portion extends downwardly from the front edge of the upper portion, and a rear portion of the lower portion extends downwardly from the rear edge of the upper portion.

In some implementations, the cross member is hollow.

In some implementations, the at least one left tube of the left member includes an upper left tube and a lower left tube extending longitudinally. The upper and lower left tubes are connected together at least at one of: front end portions of the upper and lower left tubes and rear end portions of the upper and lower left tubes. The at least one right tube of the right member includes an upper right tube and a lower right tube extending longitudinally. The upper and lower right tubes are connected together at least at one of: the front end portions the upper and lower right tubes and the rear end portions of the upper and lower right tubes.

In some implementations, the left member further includes a left connection tube connected to the upper and lower left tubes. The right member further includes a right connection tube connected to the upper and lower right tubes.

In some implementations, the left connection tube is disposed longitudinally between the front and rear end portions of the left member, and the right connection tube is disposed longitudinally between the front and rear end portions of the right member.

In some implementations, a front portion of the upper left tube and a front portion of the upper right tube are parallel to each other.

In some implementations, a rear portion of the upper left tube and a rear portion of the upper right tube are parallel to each other. The rear portion of the upper left tube is disposed leftwardly of the front portion of the upper left tube. The rear portion of the upper right tube is disposed rightwardly of the front portion of the upper right tube.

In some implementations, the stamped first portion is an upper portion having a front edge, a rear edge, a left edge being connected to the upper left tube and a right edge being connected to the upper right tube. The stamped second portion is a lower portion having a front edge, a rear edge, a left edge being connected to the lower left tube and a right edge being connected to the lower right tube.

In some implementations, the rear edges of the upper and lower portions are connected to each other, and the front edges of the upper and lower portions are connected to each other.

In some implementations, a connection between the rear edges of the upper and lower portions of the cross member is disposed vertically between the upper left tube and the lower left tube.

In some implementations, the cross member further includes a left portion connected to at least one of the upper and lower portions and a right portion connected to at least one of the upper and lower portions. The left portion has an upper edge connected to the left upper tube and a lower edge connected to the lower left tube. The right portion has an upper edge connected to the upper right tube and a lower edge connected to the lower right tube.

In some implementations, a shock absorber mount connected to the left and right members and extending laterally therebetween, the shock absorber mount being adapted to connect to one end of a shock absorber.

In some implementations, the shock absorber mount is disposed longitudinally between the cross member and the rear end portions of the left and right members.

In some implementations, the shock absorber mount includes a first shock absorber mount member connected to the left and right members and extending laterally therebetween, a left shock absorber mount member being connected to the first shock absorber mount member and the left member, a right shock absorber mount member being connected to the first shock absorber mount member and the right member, and a mounting bracket being adapted to be connected to the one end of the shock absorber and being disposed laterally between the left and right members. The mounting bracket is connected to at least one of: the left and right shock absorber mount members, and the first shock absorber mount member.

In some implementations, a brake caliper mounting bracket connected to one of the left and right members, the brake caliper mounting bracket being adapted to be connected to a brake caliper connected to a rear wheel mounted on the rear wheel axle.

In some implementations, at least one aperture is defined in one of: the at least one left tube, and the at least one right tube. The one of the at least one left tube and the at least one right tube is adapted to house a portion of a parking brake cable operatively connected to the brake caliper, and the at least one aperture is configured to receive therethrough the parking brake cable.

In accordance with another aspect of the present technology, there is provided a vehicle including a frame, at least one front wheel connected to the frame and at least one rear wheel connected to the frame. The vehicle includes a rear axle, the at least one rear wheel being mounted to the rear axle. A motor is supported by the frame and operatively connected to at least one of the wheels. A seat is connected to the frame. The vehicle also includes a swing arm having a left member including at least one left tube extending longitudinally and a right member including at least one right tube extending longitudinally. Respective front end portions of the left and right members are pivotably connected to the frame. The rear axle is mounted to respective rear end portions of the left and right members. A cross member extends laterally between the left and right members. The cross member has a stamped first portion rigidly connected to at least one of the left and right members and a stamped second portion rigidly connected to at least the other of the left and right members. The first and second portions are connected to each other and define a space therebetween.

In some implementations, a parking brake cable operatively connects a parking brake actuator to the at least one rear wheel. A portion of the parking brake cable being housed in one of the at least one left tube, and the at least one right tube.

For the purpose of this application, terms related to spatial orientation such as downwardly, rearward, forward, front, rear, left, right, above and below are as they would normally be understood by a driver of the vehicle sitting thereon in an upright position with the vehicle in a straight ahead orientation (i.e. not steered left or right), and in an upright position (i.e. not tilted).

Implementations of the present vehicle each have at least one of the above-mentioned object and/or aspects, but do not necessarily have all of them. It should be understood that some aspects of the present vehicle that have resulted from attempting to attain the above-mentioned object may not satisfy this object and/or may satisfy other objects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 13 is an exploded view of a cross member of the swing arm of FIG. 5;

FIG. 14A is a perspective view, taken from a rear, right side, of the brake assembly of the vehicle of FIG. 1;

DETAILED DESCRIPTION

The present technology is being described with respect to a three-wheel straddle-type vehicle 10. However, it is contemplated that the present technology could be used on other types of vehicles such as, for example, motorcycles, and three- or four-wheel all-terrain vehicles.

Figure 1:
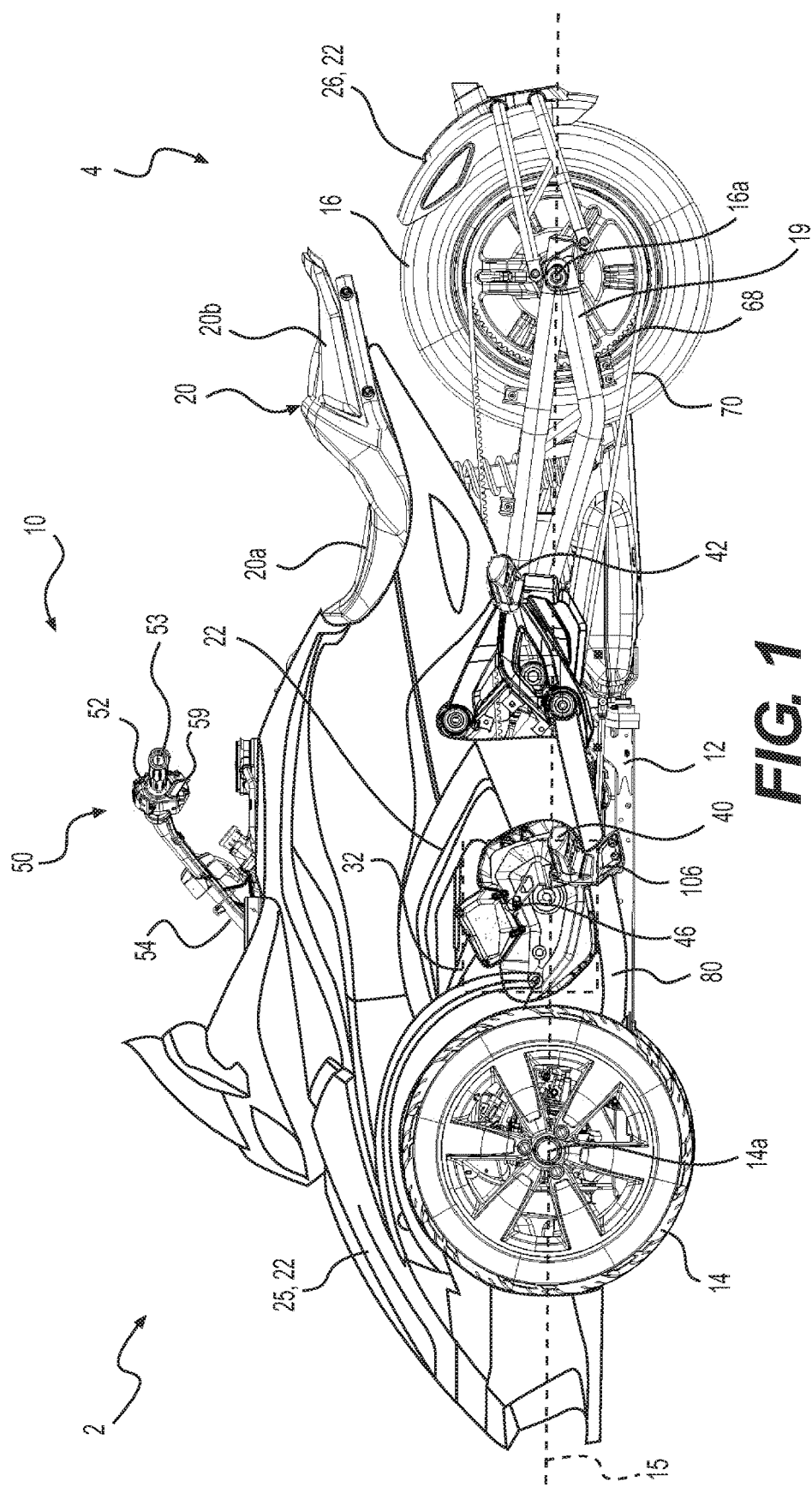
FIG. 1 is a left side elevation view of a three-wheel straddle-type vehicle.

With reference to FIG. 1, a vehicle 10 has a front portion 2 and a rear portion 4 defined consistently with the forward travel direction of the vehicle 10. The vehicle 10 has a frame 12 which has a longitudinal centerplane 7.

The vehicle 10 is a three-wheel vehicle including a left front wheel 14, a right front wheel 14 and a single rear wheel 16. It is however contemplated that the vehicle 10 could have more than one rear wheel 16. Each front wheel 14 is connected to the frame 12 by a front suspension assembly (not shown). The rear wheel 16 is connected to the frame 12 by a rear suspension assembly 19 which includes a swing arm 100 and a shock absorber 102. The rear suspension 19 will be described below in further detail. The left and right front wheels 14 and the rear wheel 16 each have a tire secured thereto. It is contemplated that the front wheels 14 or the rear wheel 16 could have more than one tire secured thereto. The front wheels 14 are equally offset from the longitudinal centerplane 7 in the lateral direction, and the rear wheel 16 is centered with the longitudinal centerplane 7. The front wheels 14 rotate about a rotation axis 14a. The rear wheel 16 rotates about a rotation axis 16a. In the illustrated implementation, each of the rotation axes 14a, 16a of the wheels 14, 16 is disposed horizontally. A common plane 15 containing the rotation axes 14a, 16a of the wheels 14, 16, when the vehicle is placed on level ground and without a driver, passenger, or any cargo loaded thereon, is referred to herein as a rotation plane 15. It is contemplated that each of the rotation axes 14a of the front wheels 14 could be disposed at an angle with respect to the horizontal, and therefore not disposed in a common horizontal plane 15. In this case, the rotation plane 15 is defined as a plane perpendicular to the longitudinal centerplane 7 and passing through the centers of the wheels 14, 16.

The vehicle 10 is a straddle-type vehicle having a straddle seat 20 disposed along the longitudinal centerplane 7 and supported by the frame 12. The straddle seat 20, which is adapted to accommodate two adult-sized riders, includes a forward seat portion 20a for the driver and a rear seat portion 20b for a passenger. The second portion 20b is higher than the first portion 20a. It is contemplated that the three-wheel vehicle 10 could not have the rear seat portion 20b.

The frame 12 supports a motor 32 (shown schematically) located vertically below the straddle seat 20 and longitudinally rearward of the front wheels 14. The motor 32 is an inline three-cylinder four-stroke internal combustion engine in the illustrated implementation of the vehicle 10. It is contemplated that the motor 32 could be another type of engine, such as a two-stroke internal combustion engine. It is contemplated that other types of motors such as, but not limited to, an electric motor, or a hybrid could also be used. The motor 32 is referred to hereinafter as engine 32 for convenience. The engine 32 is operatively connected to the rear wheel 16 to drive the rear wheel 16. It is contemplated that the engine 32 could be connected to the front wheels 14 in addition to the rear wheel 16. The engine 32 has a crankshaft (not shown) which rotates about a crankshaft axis disposed normal to the longitudinal centerplane 7. The rear wheel 16 is operatively connected to the crankshaft through a transmission 62. The transmission 62 includes a transmission output shaft 64 operatively connected to the engine 32 via a plurality of gears (not shown). It is contemplated the transmission output shaft 64 could be connected to the crankshaft so as to be coaxial therewith. It is also contemplated that the crankshaft could be the transmission output shaft 64. The transmission output shaft 64 rotates about a transmission output shaft axis 64a disposed normal to the longitudinal centerplane 7. A transmission sprocket 66 is mounted to the transmission output shaft 64. A wheel sprocket 68 is mounted to the hub of the rear wheel 16 on the left side thereof. A belt 70 is disposed about the wheel sprocket 68 and the transmission sprocket 66 to transmit power from the engine 32 to the wheel sprocket 68. The wheel sprocket 68 rotates the rear wheel 16 to propel the vehicle 10 along the ground. It is contemplated that the engine 32 could be connected to the wheel sprocket 68 via a continuously variable transmission (CVT) in addition to the transmission 62.

With reference to FIG. 1, fairings 22 are connected to the frame 12 to enclose and protect the internal components of the three-wheel vehicle 10 such as the engine 32. The fairings 22 include a hood 24 disposed at the front of the vehicle 10 between the front wheels 14. The hood 24 is pivotably connected to the frame 12 and can be disposed in an open position to provide access to a storage bin 25 disposed under the hood 24. The fairings 22 also include a rear deflector 26, or fender 26, disposed over the rear wheel 16 to protect the driver and/or passenger from dirt and water which can be lifted by the wheel 16 while it is rolling.

A steering assembly 50 is disposed forwardly of the straddle seat 20 to allow a driver to steer the two front wheels 14. The steering assembly 50 includes a handlebar 52 connected to a steering column 54. The steering column 54 is connected to the front wheels 14 via steering linkages (not shown) such that turning the handlebar 52 turns the steering column 54 which, through the steering linkages, turns the wheels 14. In the illustrated implementation of the vehicle 10, the steering assembly 50 includes a power steering unit (not shown) to facilitate steering of the vehicle 10. It is contemplated that the power steering unit could be omitted.

A left hand grip 53 and a right hand grip 53 are placed respectively around the left and right sides of the handlebar 52. A clutch actuator 59 is connected to the handlebar 52 near the left hand grip 53. It is contemplated that the clutch actuator 59 could be connected near the right hand grip 53. It is also contemplated that the clutch actuator 59 could be omitted. It is contemplated that a hand operated brake actuator could also be connected to the handlebar 52 near one of the hand grips 53.

A driver footrest 40 is disposed on either side of the vehicle 10 and vertically lower than the straddle seat 20 to support the driver's feet. The left driver footrest 40 is mounted on a left rail 80 connected to the frame 12 and disposed on a left side of the longitudinal centerplane 7. The right driver footrest 40 is mounted on a right rail 80 connected to the frame 12 and disposed on a right side of the longitudinal centerplane 7. A pair of passenger footrests 42 is disposed on each side of the vehicle 10 and rearward of the driver footrests 40 to provide support for the passenger's feet. The passenger footrests 42 are fixed to the frame 12. In the illustrated implementation, the footrests 40, 42 are in the form of foot pegs. It is however contemplated that the footrests 40, 42 could be in the form of footboards. A gear-shift actuator 46, in the form of a foot-operated gear shift lever 46, is connected to the left driver footrest 40. The gear shift actuator 46 is operatively connected to a gear shift selector of the transmission of the vehicle 10 for selecting one of a plurality of gears. It is also contemplated that the gear shift actuator 46 could be omitted, for example, in a vehicle 10 having an automatic transmission 62. It is contemplated that the gear shift actuator 46 could be omitted and that the vehicle 10 could instead have a hand-operated gear shift actuator connected to the handlebar 52.

A brake actuator (not shown), in the form of a foot-operated brake lever, is connected to the right driver footrest 40 for braking the vehicle 10. The foot brake lever is operatively connected to the brakes 45 (FIG. 14A) provided on each of the two front wheels 14 and the rear wheel 16. It is contemplated that the foot brake lever could be operatively connected only to the brakes 45 of the front wheels 14, or only to the brake 45 of the rear wheel 16. It is contemplated that the foot brake lever could be omitted and that the vehicle 10 could be provided with a hand-operated brake actuator connected to the handlebar 52 instead. It is contemplated that the brake assembly 47 could be connected to a hand-operated brake actuator mounted to the handlebar 52 in addition to the foot brake lever mounted to the right footrest 40. The vehicle 10 also includes a parking brake actuator 43 (FIG. 14A) connected to the frame and operable with the hand. The parking brake actuator 43 is operatively connected to the brake 45 provided on the rear wheel 16 as will be described below. It is contemplated that the parking brake actuator 43 could be foot-operated. It is also contemplated that the parking brake actuator 43 could be electrically actuated. For example, the parking brake actuator 43 could be electrically operated by pressing a button provided on the display panel disposed forward of the driver seat 20a.

Figure 14B:
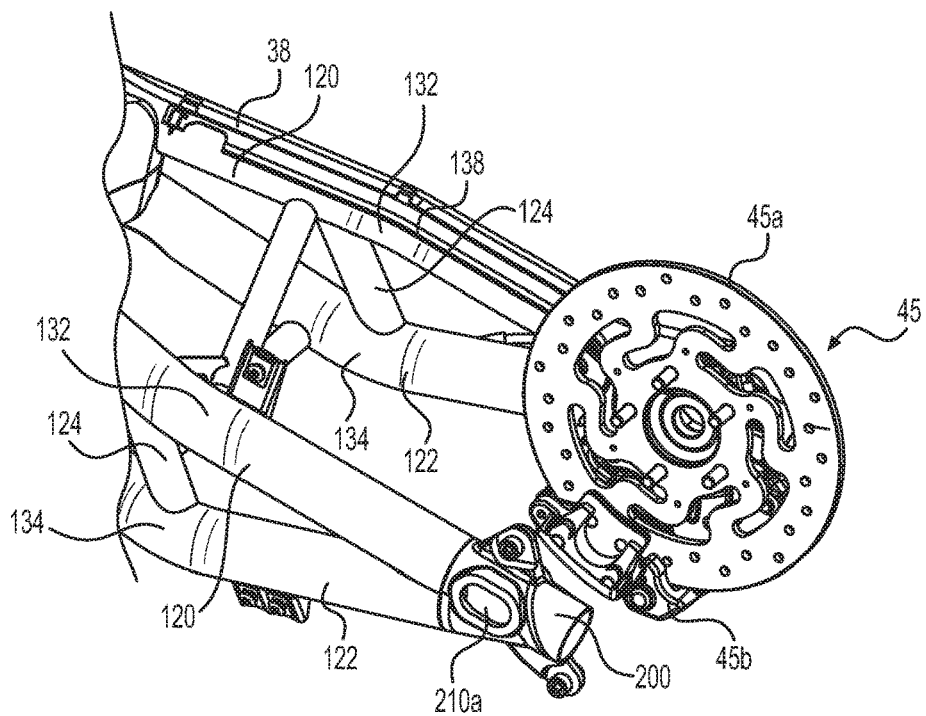
FIG. 14B is a perspective view, taken from a rear left side, of a rear portion of the swing arm of FIG. 5 with the rear wheel brake attached thereto.

With reference to FIG. 14A, each of the two front wheels 14 and the rear wheel 16 is provided with a brake 45. The brakes 45 of the three wheels 14, 16 form a brake assembly 47. Each brake 45 is a disc-type brake mounted onto a hub of its respective wheel 14 or 16. Other types of brakes are contemplated. Each brake 45 includes a rotor 45a mounted onto the wheel hub and a stationary caliper 45b straddling the rotor 45a. The brake pads (not shown) are mounted to the caliper 45b so as to be disposed between the rotor 45a and the caliper 45b on either side of the rotor 45a.

The foot brake lever is connected to a hydraulic cylinder 34. The hydraulic cylinder 34 is hydraulically connected to the hydraulic piston (not shown) of each brake caliper 45b via brake lines 38. When the foot brake lever is actuated, hydraulic pressure is applied to the hydraulic cylinder 34 and thereby to a piston (not shown) of each caliper 45b, causing the brake pads to squeeze their respective rotors 45a which, through friction, brakes the wheels 14 and 16. The hydraulic cylinder 34 is connected to a hydraulic reservoir 35 which ensures that adequate pressure is maintained in the brake lines 38 and the cylinder 34.

The parking brake actuator 43 is connected to the brake caliper 45b of the rear wheel 16 via a parking brake cable 39 and a lever 190 connected to the rear wheel brake caliper 45b. When the parking brake actuator 43 is actuated, the parking brake cable 39 pulls on the lever of the rear wheel brake caliper 45b to cause the brake pads to squeeze the rotor 45a, thereby braking the rear wheel 16. It is contemplated that the parking brake actuator 43 could be connected to the brake calipers 45b of the front wheels 14 instead of, or in addition to, being connected to the brake caliper 45b of the rear wheel 16.

The rear suspension assembly 19 will now be described with reference to FIGS. 2 to 24.

Figure 2:
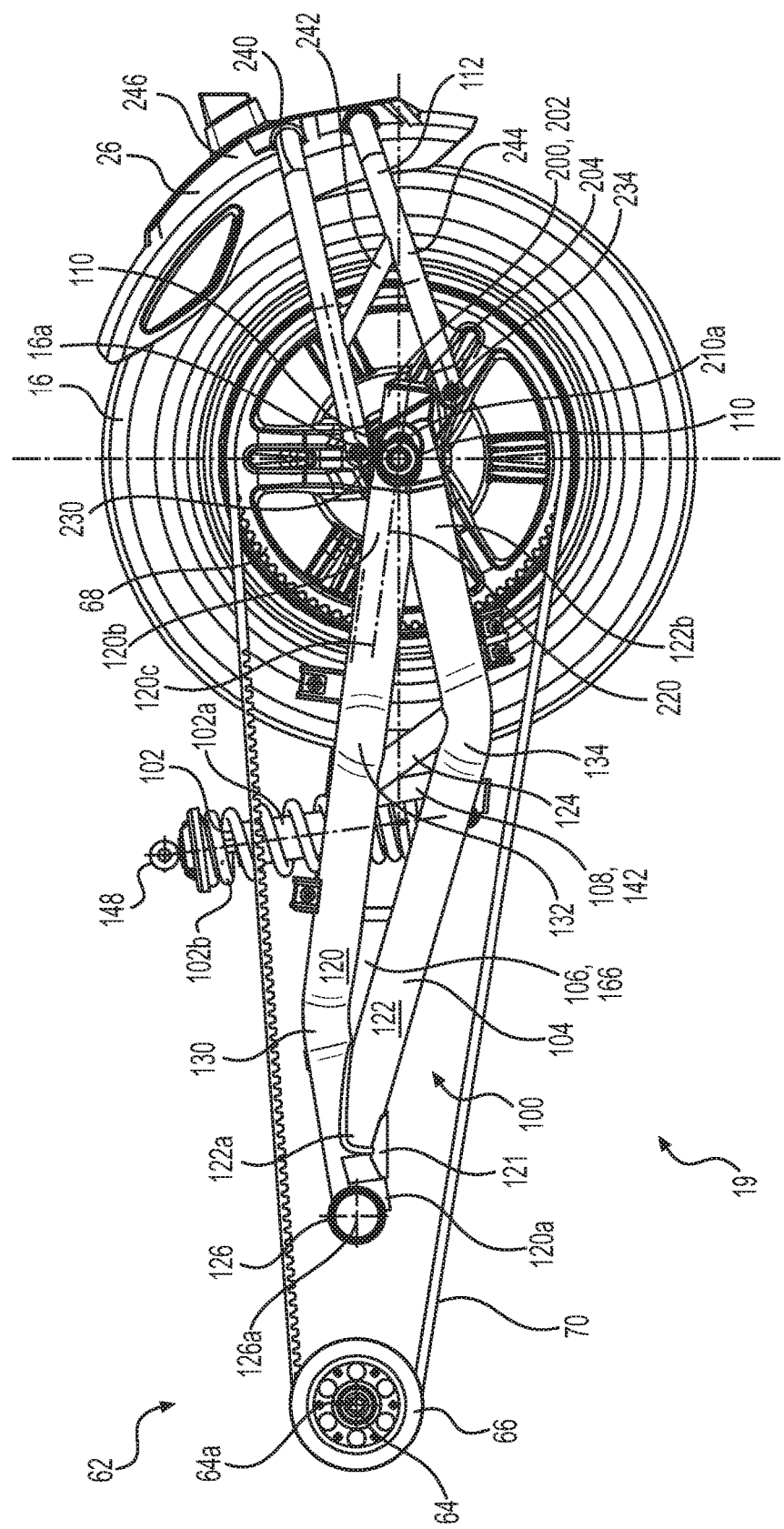
FIG. 2 is a left side elevation view of the rear suspension assembly, rear wheel, rear wheel fender and transmission of the vehicle of FIG. 1.
Figure 3:
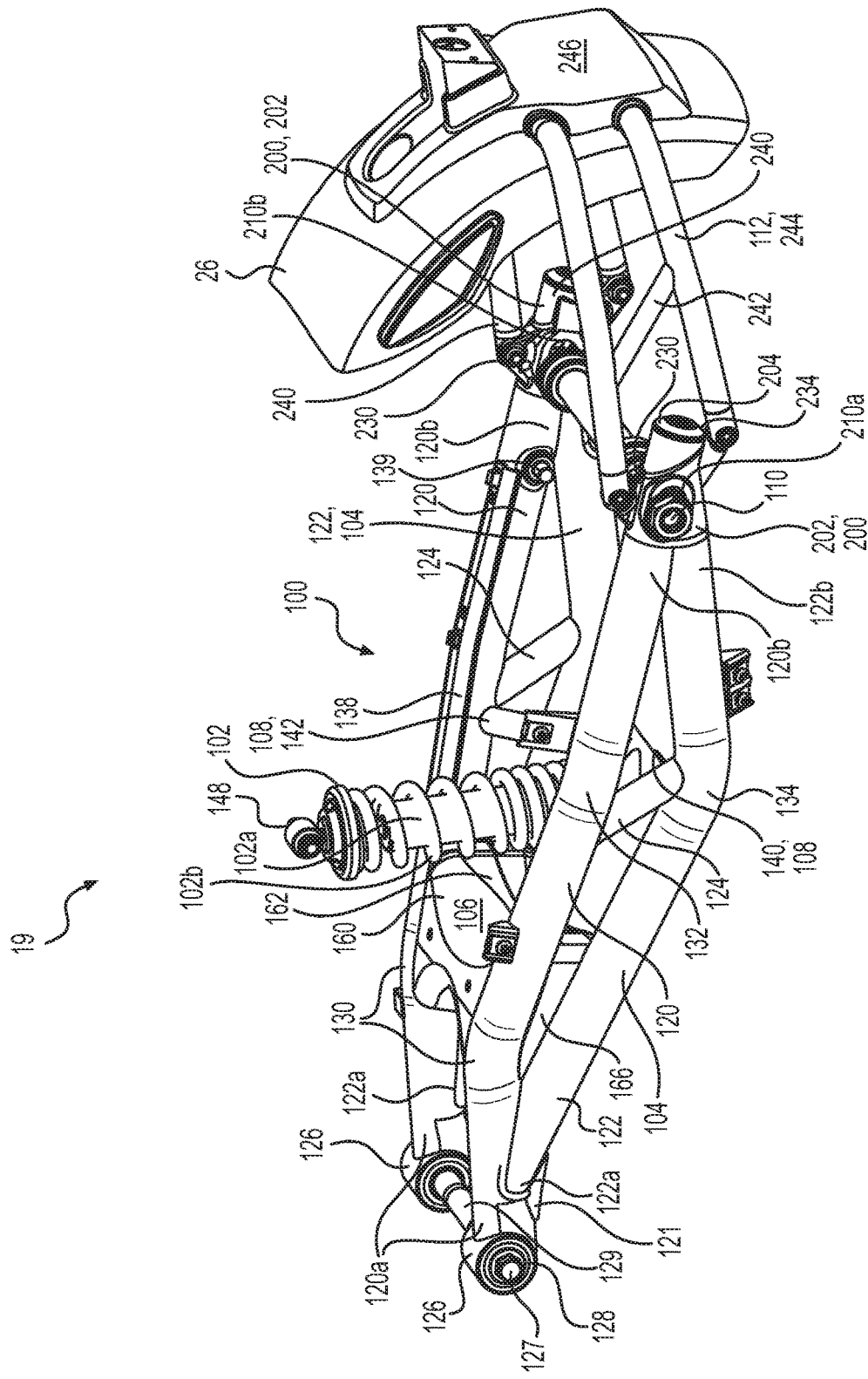
FIG. 3 is a perspective view, taken from a rear left side, of the rear suspension assembly, rear wheel fender and transmission of FIG. 2.
Figure 4:
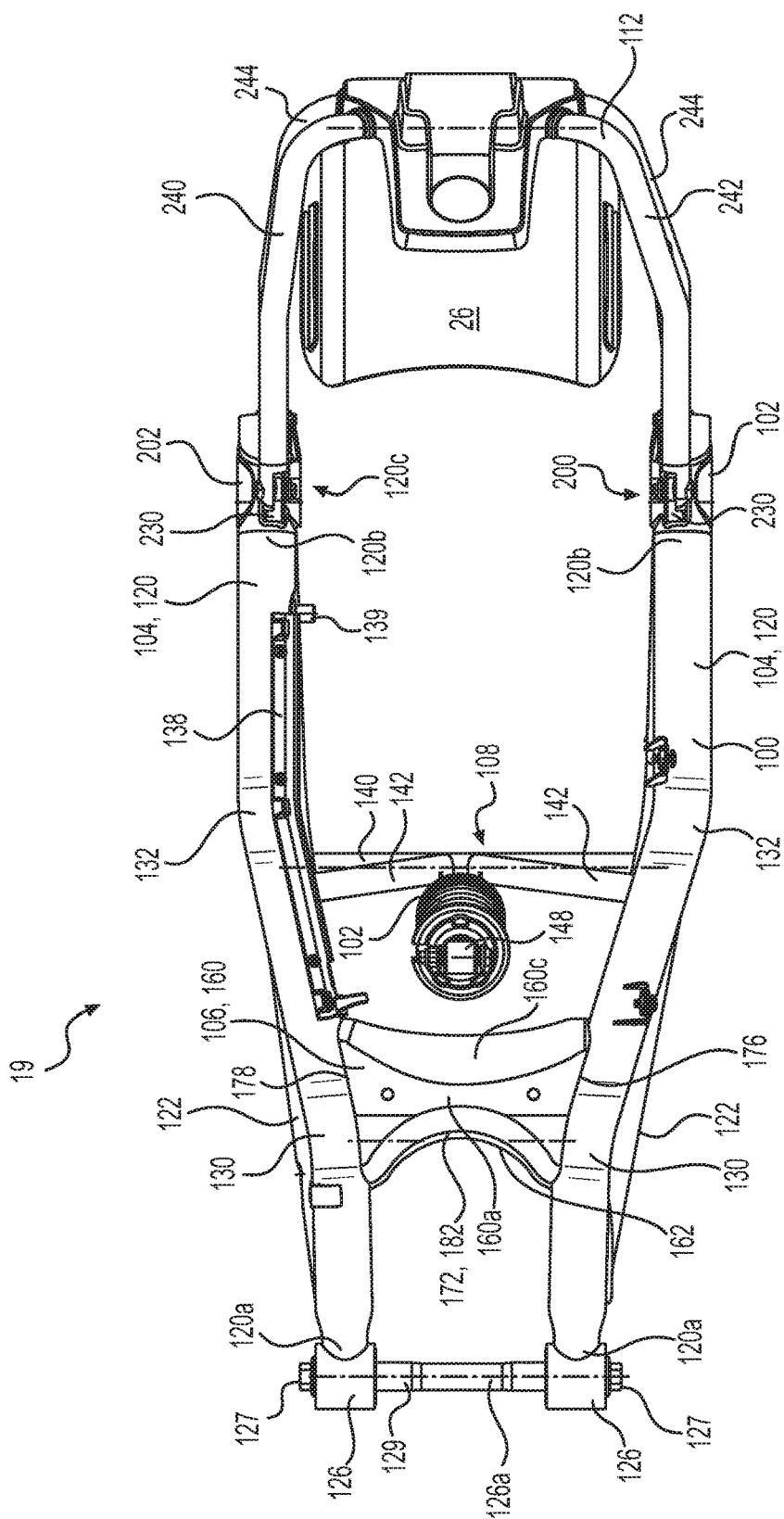
FIG. 4 is top plan view of the rear suspension assembly, rear wheel fender and transmission of FIG. 2.

With reference to FIGS. 2 to 4, the swing arm 100 of the rear suspension assembly 19 includes a left member 104 and a right member 104. A cross member 106, a shock absorber mount 108 and a rear axle 110 extend laterally between the left and right members 104. A fender support 112 connected to the left and right members 104 mounts the fender 26 over the rear wheel 16. The fender support 112 and the rear axle 110 are connected to the swing arm 104 by an axle holder 200 connected to each member 104.

The right member 104 is generally a mirror image of the left member 104. As such, only the left member 104 will be described herein. Corresponding and similar features of the left and right members have been labeled with the same reference numbers and will not be described again herein.

The left member 102 includes an upper tube 120, a lower tube 122 and a connection tube 124 rigidly connected to one another. The upper tube 120 extends from a front end 120a to a rear end 120b. A cylindrical sleeve 126 is formed at the front end of the upper tube 120. The central axis 126a of the cylindrical sleeve 126 defines the pivot axis for the connection of the swing arm 100 to the frame 12. A bolt 127 (FIG. 3) is inserted through the left sleeve 126 to connect the left member 104 to the left end of an axle 129. The axle 129 is disposed between the left and right sleeves 126 and connected to the frame 12. A bearing 128 is placed between the sleeve 126 and the bolt 127 and coaxially therewith.

Figure 6:
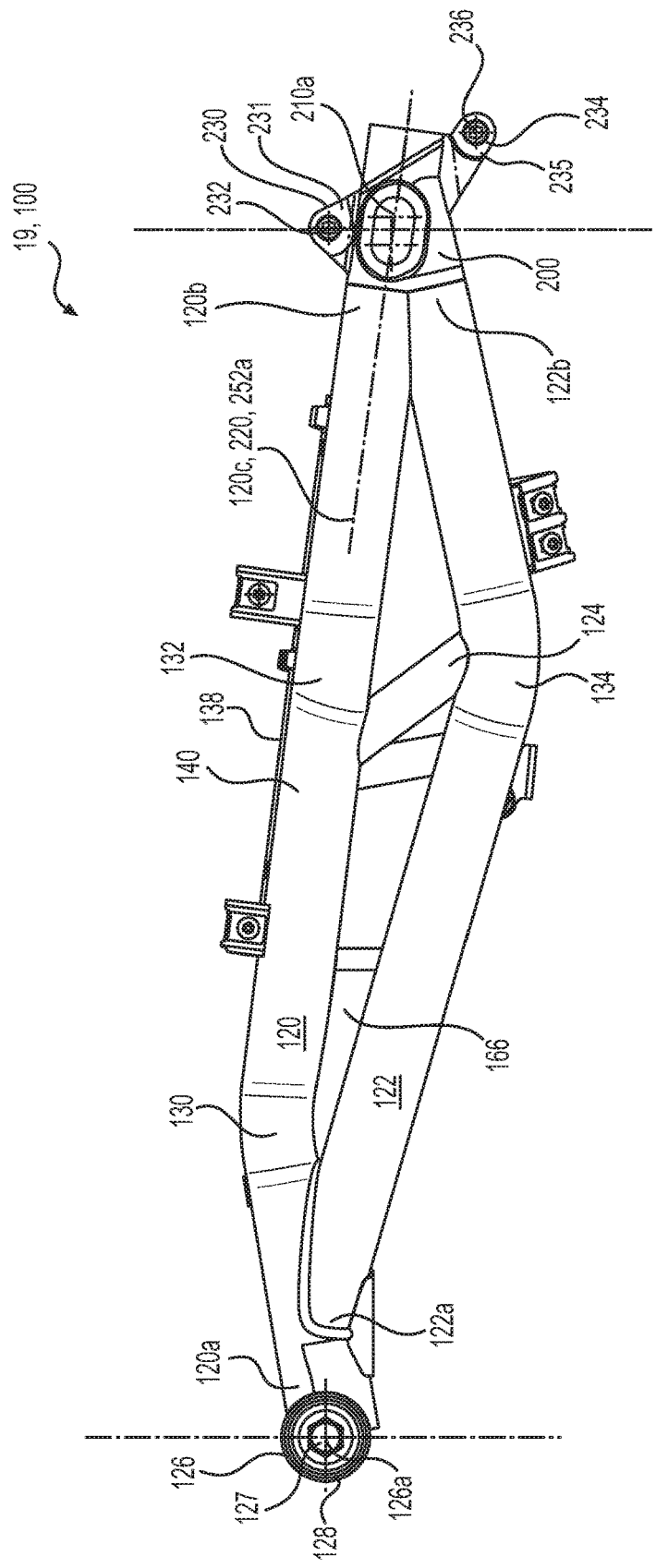
FIG. 6 is a left side elevation view of the swing arm of FIG. 5.

With reference to FIGS. 2 and 6, when viewed from a left side, the left upper tube 120 has a bend 130. From the front end 120a and the cylindrical sleeve 126, the upper tube 120 extends rearward and slightly upwards to the bend 130. From the bend 130, the upper tube 120 extends rearward and downwards to the rear end 120b. The rear end 120b is disposed vertically lower than the front end 120a of the upper tube 120. The bend 130 is closer to the front end 120a than to the rear end 120b.

Figure 7:
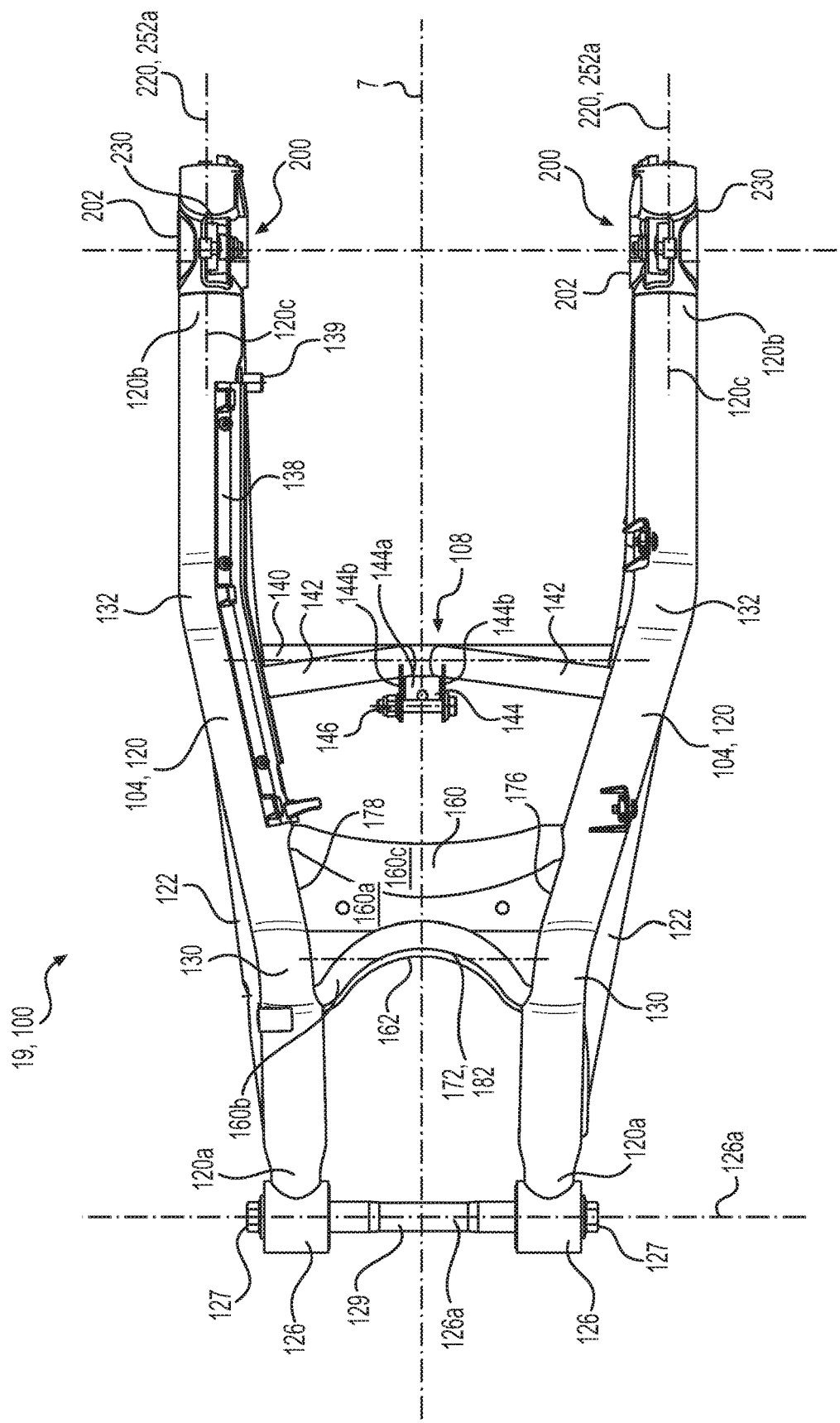
FIG. 7 is a top plan view of the swing arm of FIG. 5.

As can be seen in FIGS. 4 and 7, when viewed from above, the left upper tube 120 has another bend 132 disposed longitudinally rearward of the bend 130. The bend 132 is longitudinally aligned with the rim of the tire secured around the wheel 16 as can be seen in FIG. 2. The left upper tube 120 extends longitudinally and generally parallel to the longitudinal centerplane 7 between the front end 120a and the bend 130. The left upper tube 120 extends rearward and leftwardly (laterally outwardly) from the bend 130 to the bend 132. From the bend 132, the left upper tube 120 then extends rearward and generally parallel to the longitudinal centerplane 7 to the rear end 120b. Thus, the front portions of the upper tubes 120 of the left and right members 104 extend parallel to one another between their respective front ends 120a and the respective bends 130. The rear portions of the left and right upper tubes 120, between the bends 132 and their respective rear ends 120a, also extend parallel to one another. In a middle portion, between their respective bends 130 and 132, the upper left and right tubes 120 extend rearward, downwardly and laterally away from one another.

Figure 8:
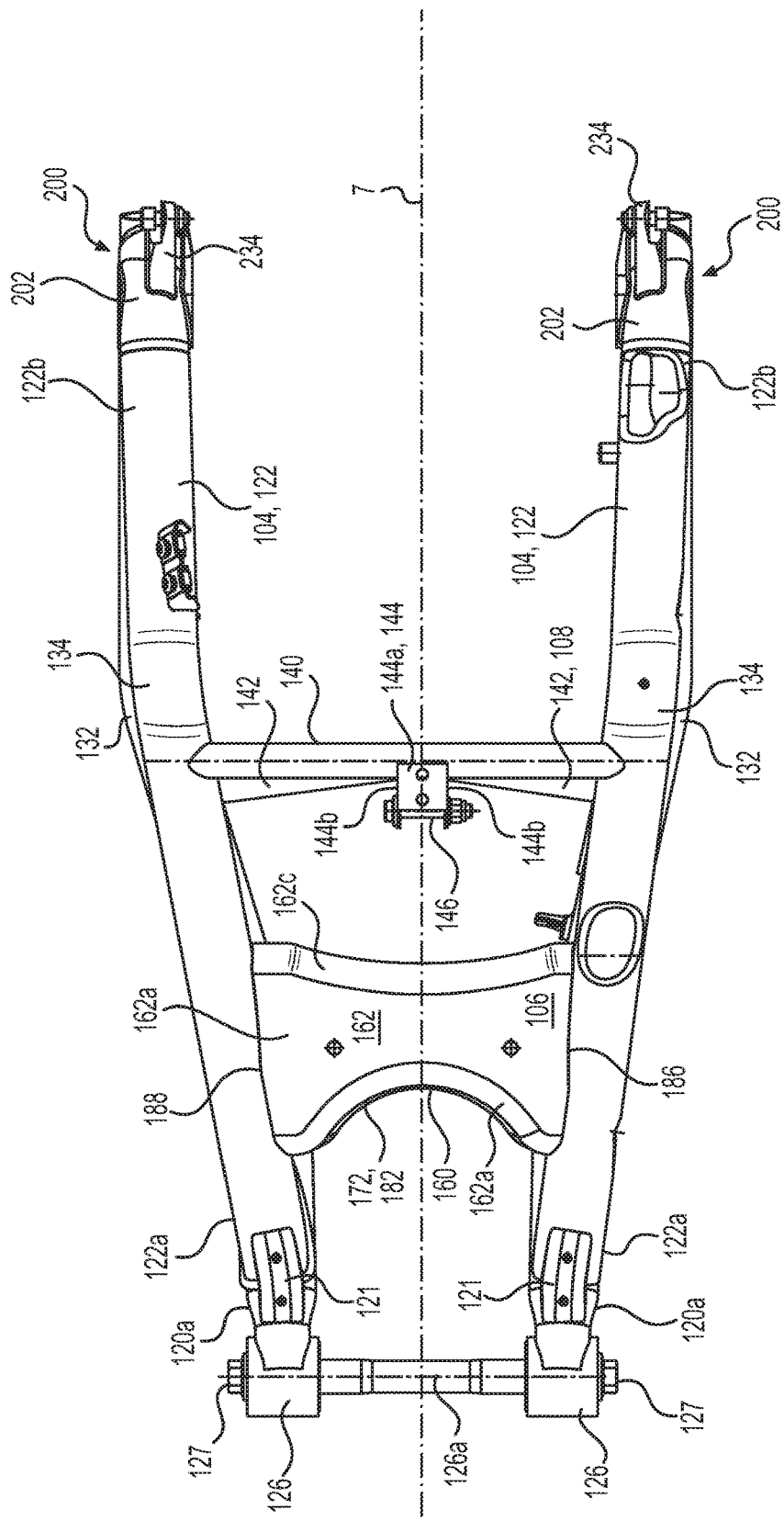
FIG. 8 is a bottom plan view of the swing arm of FIG. 5.

As can be seen in FIGS. 2 to 6 and 8, the lower tube 122 extends from a front end 122a to a rear end 120b. The front end 122a of the lower tube 122 is welded to a front end portion of the upper tube 120. The connection of the front end 122a of the lower tube 122 to the upper tube 120 is also reinforced by a bracket 121 as can be seen in FIG. 8. It is contemplated that the front end 122a could be connected to the upper tube 120 by any suitable means. In the illustrated implementation of the swing arm 100, the front end 120a of the upper tube 120 is disposed longitudinally forward of the front end 122a of the lower tube 122. It is contemplated that the lower tube front end 122a could be disposed longitudinally forward of the upper tube front end 122a, or the front end 120a, 122a could be longitudinally aligned.

As can be seen in FIGS. 2 to 6, the lower tube 122 extends downwards and rearwards from the front end 122a to a bend 134. From the bend 134, the lower tube 122 extends upwards and rearwards to the rear end 122b. The rear end 122b is disposed vertically lower than the front end 122a of the lower tube 120. The bend 134 of the lower tube 122 is closer to its rear end 122b than to its front end 122a. The bend 134 of the lower tube 122 is disposed longitudinally rearward of the bend 130 of the upper tube 120. The lower tube bend 134 is longitudinally aligned with the bend 132 of the upper tube 120. The bend 134 is also longitudinally aligned with the rim of the tire secured around the wheel 16 as can be seen in FIG. 2. As can be seen in FIG. 8, the lower tube 122 extends rearwardly and leftwardly from its front end 120a to its rear end 120b.

The rear end 122b of the lower tube 122 is connected to a rear end 120b of the upper tube 120. Thus, the rear ends 120b, 122b are longitudinally aligned. It is contemplated that the rear end 120b of the upper tube 120 could be disposed longitudinally forward or rearward of the rear end 122b of the lower tube 122. The rear ends 120b, 122b of the tubes 120, 122 are welded to each other. It is contemplated however that the connection between the rear ends 120b, 122b could be made by means other than welding, for example, by fasteners such as bolts, clamps and the like. The left axle holder 200 is connected to rear ends 120a, 120b of both tubes 120, 122 and will be described below.

With reference to FIGS. 2, 3, 5 and 6, the connection tube 124 is connected to the lower tube 122 at the bend 134. From the bend 134, the connection tube 124 extends forwardly and upwardly to the upper tube 120. The connection tube 124 is connected to the upper tube 120 longitudinally forward of the bend 132 and longitudinally rearward of the bend 130. The connection between the upper tube 120 and the connection tube 124 is disposed closer to the bend 132 than the bend 130. The connection tube 124 therefore forms a triangular truss-like formation with the rear portion of the upper and lower tubes 120, 122. The front portions of the upper and lower tubes 120, 122 form a trapezoidal structure with the connection tube 124. The connection tube 124 is narrower is cross-section than the upper and lower tubes 120, 122. It is however contemplated that the connection tube 124 could have the same cross-sectional dimensions as the upper and lower tubes 120, 122. The upper and lower tubes 120, 122 have generally the same cross-sectional shape and dimension. It is however contemplated that the upper tube 120 could have a different cross-sectional shape and/or dimension than the upper and lower tubes 120, 122.

It is contemplated that the tubes 120, 122 and 124 could each have a geometry that is different from the one described above. It is also contemplated that the tube 124 could be omitted or that additional tubes could be connected between the upper and lower tubes 120, 122.

With reference to FIG. 14A, a portion of the parking brake cable 39 connected to the parking brake actuator 43 is housed in the right lower tube 122. The right lower tube 122 of the right member 104 has two apertures 136, 137 in the right facing wall thereof. The parking brake cable 39 extends from the parking brake actuator 43 into the tube 122 through the forward aperture 136 and exits from the tube 122 through the rearward aperture 137 to connect to the brake caliper 45b of the rear wheel brake 45. The right lower tube 122 thus provides a protected path for the portion of the parking cable 39 housed therein. The portion of the parking brake cable 39 housed in the right lower tube 122 is protected from dust, dirt, debris, water, snow, and the like being kicked up by the wheel 16. The portion of the parking brake cable 39 housed inside the right lower tube 122 is also partially insulated from heat being generated by the muffler. In addition, the visual appeal of the vehicle 10 is enhanced by having a portion of the parking brake cable 39 being hidden. It is contemplated that the parking brake cable 39 could be housed in the right upper tube 120, or in one of the left tubes 120, 122. It is contemplated that the aperture 136 could be omitted and the parking brake cable 39 could enter the tube 120 or 122 through the opening of the tube 120 or 122 at the front end thereof (for example, in a configuration of the swing arm 100 in which the front end of the tube 120 or 122 housing the parking brake cable 39 does not have the sleeve 126). Similarly, it is contemplated that the aperture 137 could be omitted and instead of exiting the tube 120 or 122 through the aperture 137, the parking brake cable 39 could exit the tube 120 or 122 through the opening at the rear end (for example, in a configuration of the swing arm 100 in which the rear end of the tube 120 or 122 housing the parking brake cable 39 does not have the axle holder 200 connected thereto).

With reference to FIG. 14A, a bracket 138 is connected to the upper surface of the upper tube 120 of the right member 120. The bracket 138 has pairs of laterally spaced tabs (best seen in FIG. 3) for holding one of the brake lines 38 connected to the rear wheel brake 45. It is contemplated that the bracket 138 could be connected to a different surface of the right upper tube 120. It is contemplated that the bracket 138 could be connected to the right lower tube 122, to the left upper or lower tubes 120, 122. It is contemplated that the portion of the brake lines 38 extending toward the brake caliper 45b of the rear wheel brake 45 could be housed in one of the tubes 120, 122 of the left or right member 104 instead of being supported on the outer surface thereof by the bracket 138. It is contemplated that the brake line 38 and the parking brake cable 39 could be housed in the same tube 120, 122, or in different tubes 120, 122.

It is contemplated that any one or more of the tubes 120, 122, 124, 140, 142 of the swing arm 100 could be used to house a portion of an element extending laterally, longitudinally or vertically through the vehicle 10. For example, the element housed in the tube could be an electrical wire for powering a device connected to the vehicle 10, or a control wire for communicating therewith. As another example, the element could be a hydraulic or pneumatic line for passage of fluid such as the brake lines 38. It is contemplated that one of the tubes 120, 122, 124, 140, 142 could house a plurality of such elements.

Figure 14C:
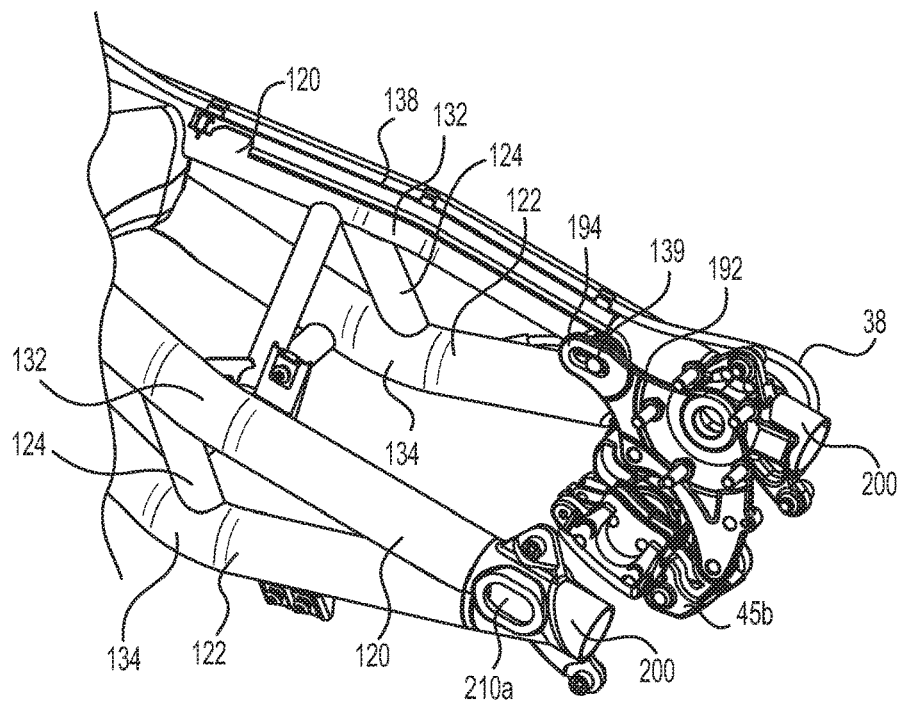
FIG. 14C is a perspective view, taken from a rear left side, of a rear portion of the swing arm of FIG. 5 and the rear wheel brake of with a rotor of the rear wheel brake removed for clarity.

As can be seen in FIG. 3, the left facing portion of the right upper tube 120 has a caliper mounting bracket 139, in the form of a cylindrical projection 139 extending laterally. As can be seen in FIG. 14C the caliper 45b of the rear wheel brake 45 is suspended from the projection 139 by a bracket 192 having an elongated slot 194. The pin 139 is received in the elongated slot 194 so that the caliper 45b is adjustable along with the wheel 16. The pin 139 serves to retain the caliper 45b and the bracket 192, and prevents rotation of the caliper 45b and bracket 192 during braking of the rear wheel 16.

Figure 11:
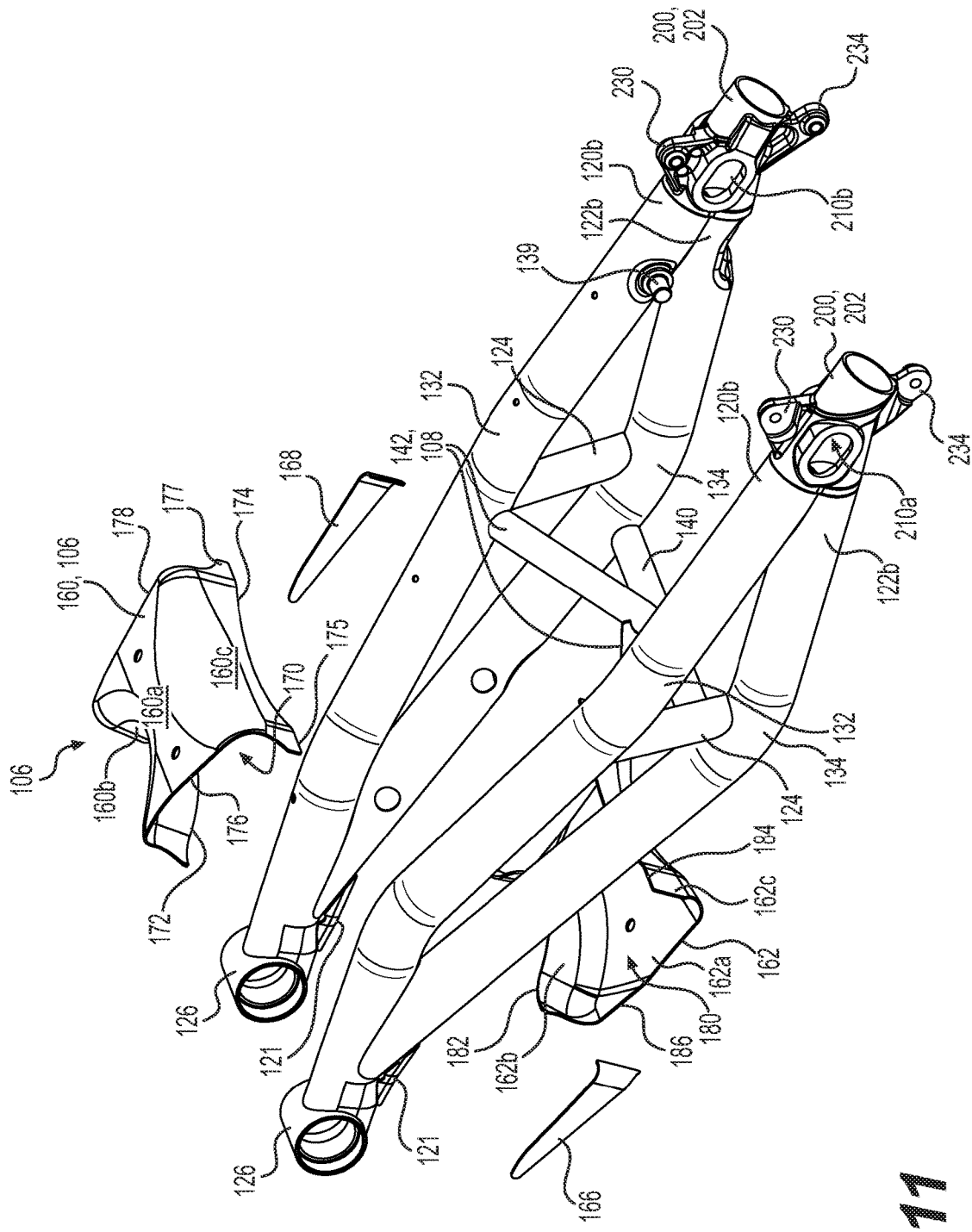
FIG. 11 is a partially exploded perspective view, taken from a rear left side, of the swing arm of FIG. 5.
Figure 12:
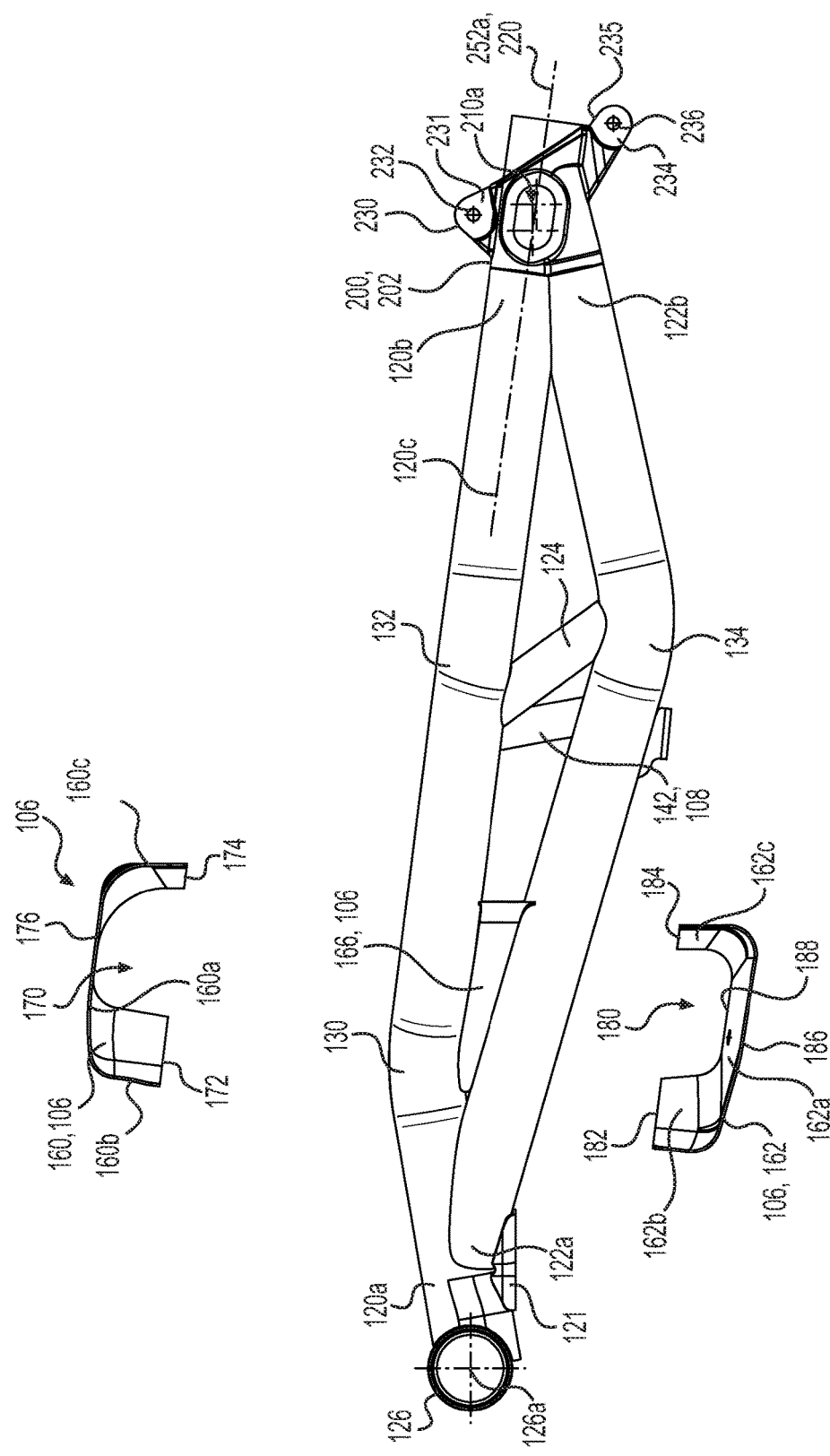
FIG. 12 is a partially exploded left side elevation view of the swing arm of FIG. 5.

With reference to FIGS. 11 to 13, the cross member 106 will now be described. The cross member 106 is made of an upper portion 160 and a lower portion 162 that are connected to each other and to the left and right members 104. The cross member 106 also includes a left side portion 166 connected to the left tubes 120, 122 and a right side portion 168 connected to the right tubes 120, 122. The cross member 106 serves to increase torsional stiffness of the rear suspension assembly 19. In the illustrated implementation of the rear suspension assembly 19, the portions 160, 162, 166, 168 of the cross member 106 are made by stamping. It is however contemplated that the cross member 106 could be made by any suitable process.

As can be seen in FIG. 13, the upper portion 160 has a generally horizontally extending middle portion 160*a* connected to a front portion 160*b* and a rear portion 160*c*. The front and rear portions 160*b* and 160*c* extend generally vertically. The front portion 160*b* extends upwardly from a front edge 172 to the middle portion 160*a* and the rear portion 160*c* extends upwardly from a rear edge 174 to the middle portion 160*a*. A downwardly facing recess 170 is formed between the front and rear portions 160*b*, 160*c*.

With reference to 7, a left edge 176 of the upper portion 160 is connected to the left upper tube 120 and a right edge 178 of the upper portion 160 is connected to the right upper tube 120. A front portion of the left edge 176 is connected to the portion of the left upper tube 120 longitudinally forward of its bend 130. The left edge 176 extends longitudinally rearward of the left tube bend 130. A front portion of the right edge 178 is connected to the portion of the right upper tube 120 longitudinally forward of its bend 130. The right edge 176 extends longitudinally rearward of the right tube bend 130.

With reference to FIG. 13, a lower left portion 175 of the rear portion 160*c* extends leftwardly of the middle portion 160*a* and is disposed between the upper and lower tubes 120, 122 of the left member 104. Similarly, on the right side, a lower right portion 177 of the rear portion 160*c* is disposed between the right upper and lower tubes 120, 122 of the right member 104.

With reference to FIGS. 11 to 13, the lower portion 162 has a generally horizontally extending middle portion 162*a* connected to a front portion 162*b* and a rear portion 162*c*. The front and rear portions 162*b* and 162*c* extend generally vertically. The front portion 162*b* extends downwardly from a front edge 182 to the middle portion 162*a* and the rear portion 162*c* extends downwardly from a rear edge 184 to the middle portion 162*a*. A downwardly facing recess 180 is formed between the front and rear portions 162*b*, 162*c*.

Figure 9:
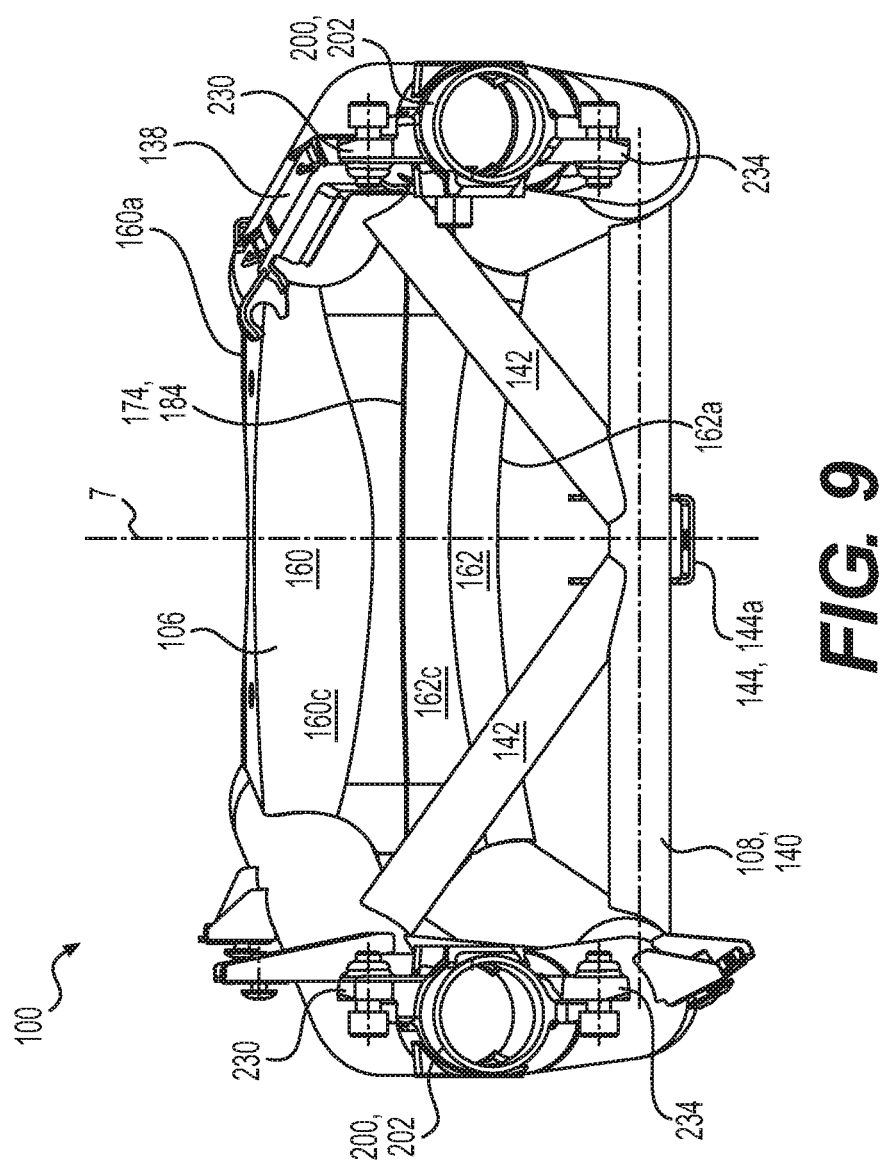
FIG. 9 is a rear elevation view of the swing arm of FIG. 5.
Figure 10:
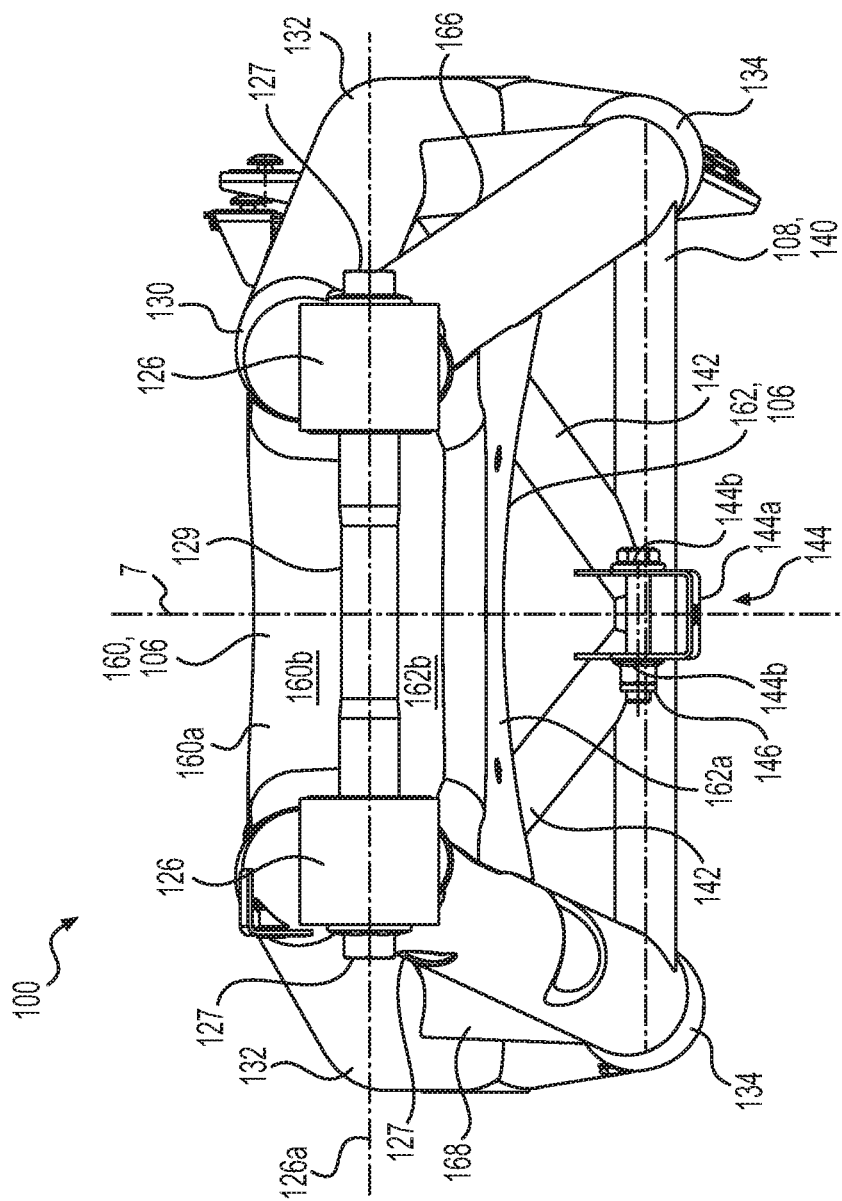
FIG. 10 is a front elevation view of the swing arm of FIG. 5.

With reference to 8, a left edge 186 of the lower portion 162 is connected to the left lower tube 122. A right edge 178 of the lower portion 162 is connected to the right lower tube 122. The front edge 182 of the lower portion 162 is connected to the front edge 172 of the upper portion 160. The rear edge 184 of the lower portion 162 is connected to the rear edge 174 of the upper portion 160 as can be seen in FIGS. 5 and 9.

With reference to FIG. 13, an upper left portion 185 of the rear portion 162*c* extends leftwardly of the middle portion 160*a* and is disposed between the upper and lower tubes 120, 122 of the left member 104. Similarly, on the right side, an upper right portion 187 of the rear portion 162*c* extends rightwardly of the middle portion 160*a* and is disposed between the right upper and lower tubes 120, 122 of the right member 104.

With reference to FIGS. 11 to 13, the cross member 160 also includes a left portion 166 disposed between the tubes 120, 122 of the left member 104, and a right portion 168 disposed between the tubes 120, 122 of the right member 104. The portions 166, 168 increase the torsional stiffness of the rear suspension assembly 19.

Figure 5:
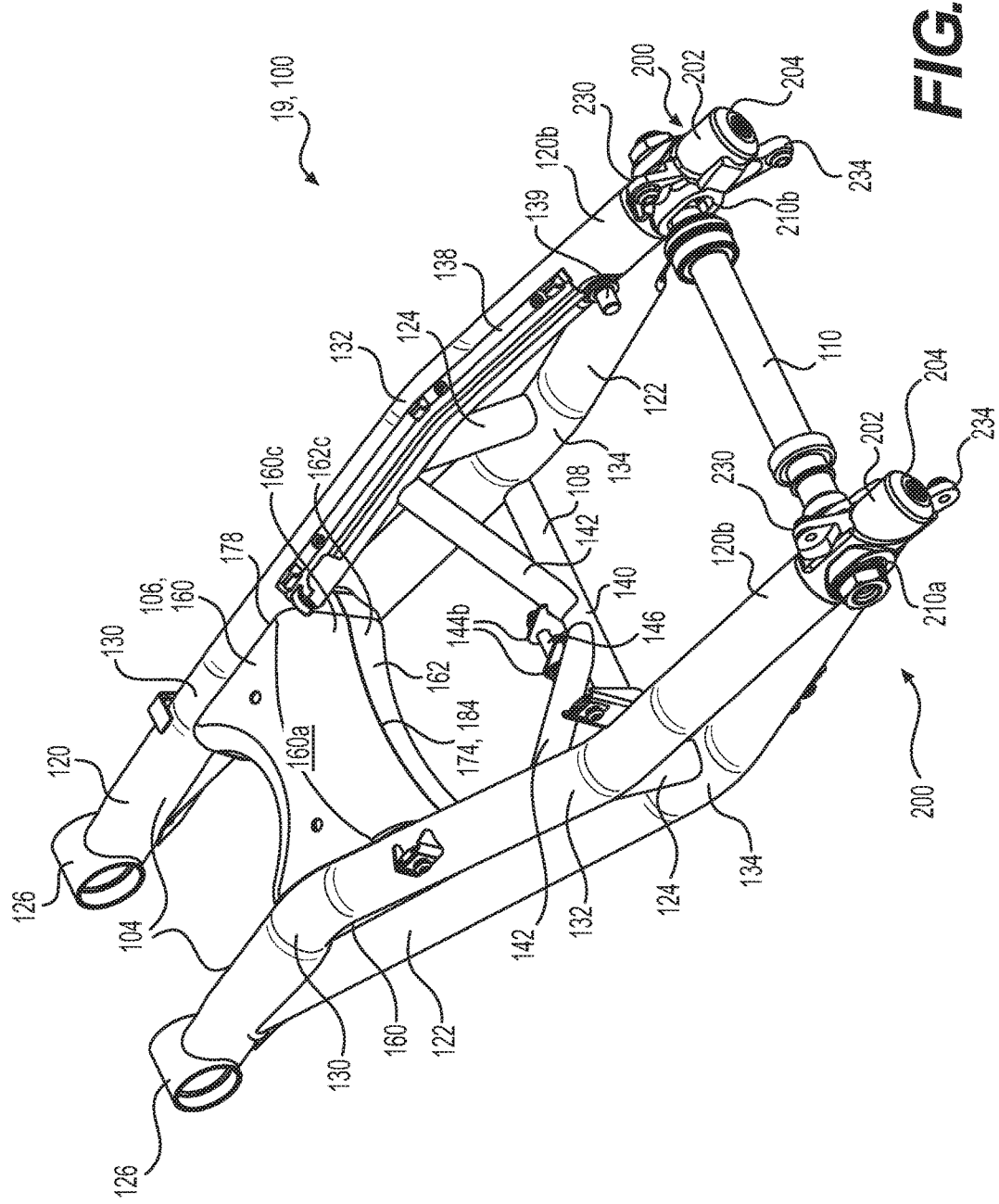
FIG. 5 is a perspective view, taken from a rear left side, of the swing arm of the rear suspension assembly of FIG. 2.

As can be seen in FIGS. 3 and 5, the left portion 166 has an upper edge connected to the left upper tube 120 and a lower edge connected to the left lower tube 122. A rear edge of the left portion 166 is connected to the left edges 176, 186 along the portions 175, 185 of the upper and lower portions 160, 162. Similarly, the right portion 168 has an upper edge connected to the right upper tube 120 and a lower edge connected to the right lower tube 122. A rear edge of the right portion 168 is connected to the right edges 178, 188 along the portions 177, 187 of the upper and lower portions 160, 162.

The stamped portions 166, 168 also prevent entry of debris through the space between the left upper and lower tubes 120, 122 into the space enclosed between the upper and lower stamped portions 160, 162.

Since the cross member 106 is connected to the left and right members 104 near the connection between their respective upper and lower tubes 120, 122, the portions 166, 168 are generally triangular in shape. It is however contemplated cross member could not be connected to the upper and lower tubes 120, 122 of the members 104 near where they connect together. The portions 166, 168 would then have a trapezoidal shape or a shape conforming to that particular location.

As can be seen in FIGS. 7 to 10, the upper surface of the cross member portion 160 is generally vertically aligned with an upper surface of the portion of the upper tube 120 connected to the cross member 106. The lower surface of the cross member portion 162 is generally vertically aligned with a lower surface of the portion of the lower tubes 122 connected to the cross member 106. The cross member 106 thus has a vertical depth generally spanning the distance between the upper surface of the upper tubes 120 and lower surface of the lower tubes 122 (in the portion of the connected to the cross member 106). The cross member 106 has a length in the longitudinal direction spanning the longitudinal distance between the front edges 172, 182 and the rear edges 174, 184. The cross member 106 is hollow and thus considerably light while also providing a relatively large resistance to torsional forces exerted on the swing arm 100, in situations such as for example, during turning of the vehicle, travel on uneven ground, or when experiencing a flat tire.

The upper portion 160 is made by stamping a piece of sheet metal to form the recess 170. The lower portion 162 is made by stamping a piece of sheet metal to form the recess 180. The portions 166, 168 are also made by stamping a piece of sheet metal cut to the appropriate dimensions either after, before or during stamping. It is contemplated that the cross member 106 could be in the form of an extruded piece, however, using two stamped portions is comparatively more cost effective and also allows attachment of the cross member to portions of the tubes 120, 122 having bends. A single integral piece would be difficult to install between bent portions of the tubes 120, 122. Nonetheless, cross members made by extrusions or other processes are contemplated for some aspects of the technology described herein.

It is contemplated that the shape and dimensions of the cross member 106 could be different than as shown herein. It is contemplated that the swing arm 100 could have more than one cross member 106. It should also be understood that instead of being formed of upper and lower portions 160, 162, the cross member 106 could be constructed of a left and a right portion connected together, with the left portion being connected to the left member 104, and the right portion being connected to the right member 104. It is also contemplated that more or less portions than described above could be used to form the cross member 106.

With reference to FIGS. 4 to 6, the shock absorber mount 108 includes a central lower member 140, and upper left and right member 142. The central lower member 140 is disposed generally horizontally and extends laterally between the left and right members 104. The left end of the central lower member 140 is connected to the lower left tube 122 of the left member 104 longitudinally forward of its bend 134. The right end of the central lower member 140 is connected to the lower right tube 122 of the left member 104 longitudinally forward of its bend 134. The bottom surface of the central member 140 is aligned vertically with the bottom surface of the lower left tube 122 at the connection therebetween. The bottom surface of the central member 140 is aligned vertically with the bottom surface of the lower right tube 122 at the connection therebetween.

As can be seen in FIGS. 4 to 6, the upper left member 142 of the shock absorber mount 108 is connected to a central portion of the central member 140, slightly leftward of the longitudinal centerplane 7. The upper left member 142 of the shock absorber mount 108 extends upwardly, forwardly and leftwardly from the central member 140 to the upper left tube 120 of the left member 104. The upper left tube 120 of the left member 104 is connected to the upper left member 142 of the shock absorber mount 108 longitudinally forwardly of the connection between connection tube 124 and the upper left tube 120. The upper right member 142 of the shock absorber mount 108 is generally a mirror image of the upper left member 142, and will therefore not be described again. In the illustrated implementation, the upper left and right members 142 are not directly connected to each other, and their connection with the central member 140 is offset from the longitudinal centerplane 7 but it is contemplated that the members 140, 142 could all be connected together at a common point disposed in the longitudinal centerplane 7.

As best seen in FIG. 7, a bracket 144 is connected to the members 140, 142. The bracket 144 includes a bottom tab 144a connected to the bottom surface of the central member 140 and extending forwardly therefrom. The bottom tab extends horizontally and laterally. Vertical tabs 144b extends upwards from the left and right edges of the bottom tab 144a. The left vertical tab 144b is connected to the front surface of the lower central member 140 and the upper left member 142 and extends forwardly therefrom. The right vertical tab 144b is connected to the front surface of the lower central member 140 and the upper right member 142 and extends forwardly therefrom. Each vertical tab 144b has a through hole (not shown). The through-holes of the left and right tabs 144b are aligned with each other and are used for the attachment of the shock absorber 102 as will be explained below.

With reference to FIGS. 2 and 3, the shock absorber 102 includes a hydraulic damper 102a and a coil spring 102b disposed coaxially around the hydraulic damper 102a. The spring 102b can be compressed to absorb bumps as the vehicle 10 travels over uneven ground. A cylindrical sleeve 148 is formed at each end of the shock absorber 102 (the sleeve 148 of the top end of the shock absorber 102 can be seen in FIGS. 2 to 4). The cylindrical sleeve 148 of the lower end of the shock absorber 102 is placed between the vertical tabs 144b and a bolt 146 (FIG. 7) is inserted through the aligned holes of the vertical tabs 144b and the cylindrical sleeve 148 to fasten the shock absorber 102 to the bracket 144 of the shock absorber mount 108 and thereby, to the swing arm 100. The cylindrical sleeve 148 at the upper end of the shock absorber 102 is connected to a portion of the frame 12 below the seat 20.

In addition to mounting the shock absorber 102, the shock absorber mount 108 also helps to counteract the torsion forces experienced by the swing arm 100 and to maintain a constant separation between the left and right members 104 of the swing arm 100.

The members 140, 142 of the shock absorber amount 108 are in the form of tubes having a circular cross-sectional shape. The members 140, 142 of the shock absorber amount 108 are narrower is cross-section than the tubes 120, 122, 124 of the left and right members 104. It is however contemplated that the members 140, 142 could have the same cross-sectional dimensions as any one of the tubes 120, 122, 124. The members 142 are connected to the central member 140 and the left and right member tubes 120 by welding. It is contemplated however that the connection of the between the members 142, 142, 120 could be made by means other than welding, for example, the tubes 120, 122 could be connected by fasteners such as bolts, clamps and the like.

The axle holder 200 will now be described with reference to FIGS. 15 to 24. The left axle holder 200 connected to the rear end of the left member 104 is a mirror image of the right axle holder 200 connected to the rear end of the right member 104. As such, only the left axle holder 200 will be described herein in detail. Corresponding features of the left and right axle holders 200 are numbered using the same reference numbers.

With reference to FIGS. 15 to 20, the axle holder 200 includes a body 202 and a cap 204. The axle holder body 202 has a front end 206 and a rear end 208. The body 202 encloses an interior space 207 (FIGS. 18, 20) between the front and rear ends 206, 208. The front and rear ends 206, 208 are both open and the cap 202 is used to close the rear open end 208. The front end 206 of the body 202 is welded to the rear ends 120b, 122b of the upper and lower left tubes 120, 122. It is however contemplated that the body 202 could be attached to the tubes 120, 122 by means of fasteners or other types of connections. The axle holder body 202 and the cap 204 are made of aluminum. It is contemplated that the body 202 and the cap 204 could be made of other suitable materials. The body 202 is made by casting but it is contemplated that the body 202 could be made by other means.

Figure 18:
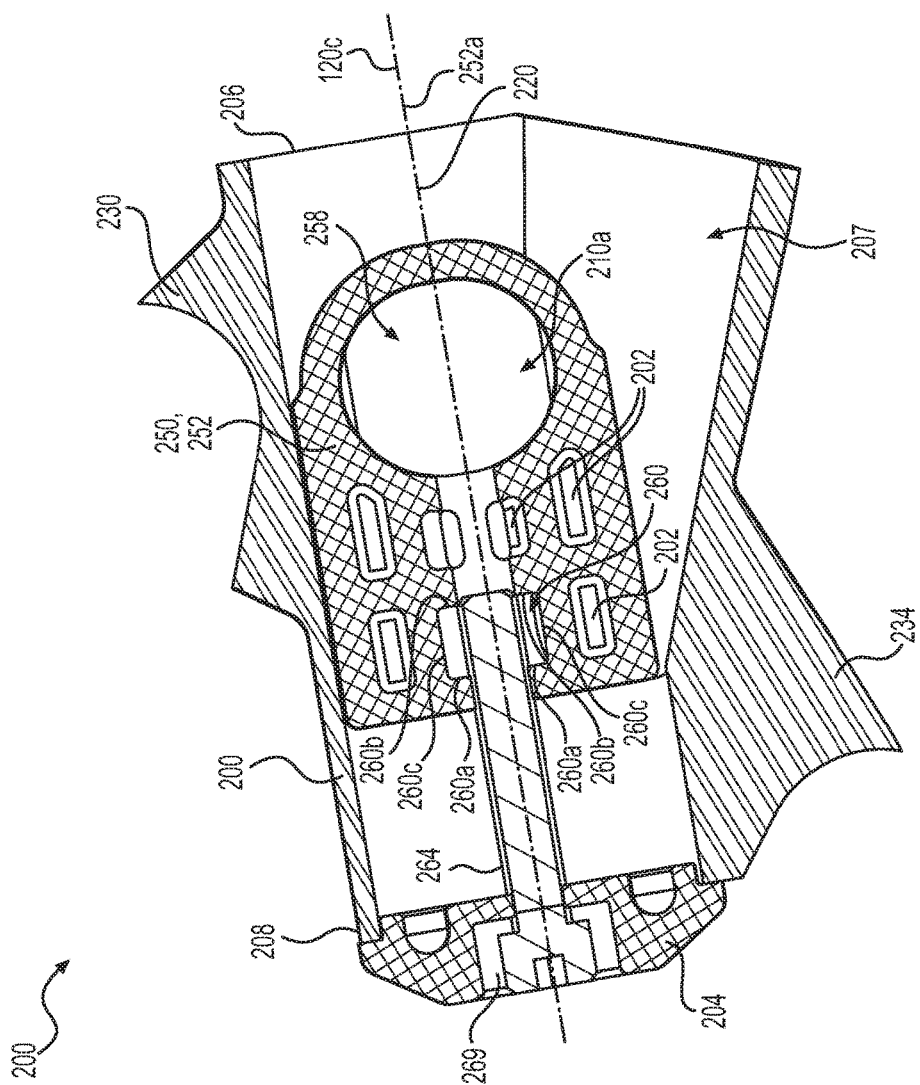
FIG. 18 is a cross-sectional view of the left axle holder and left axle adjuster assembly of FIG. 15 taken along the line 18-18 of FIG. 16.
Figure 19:
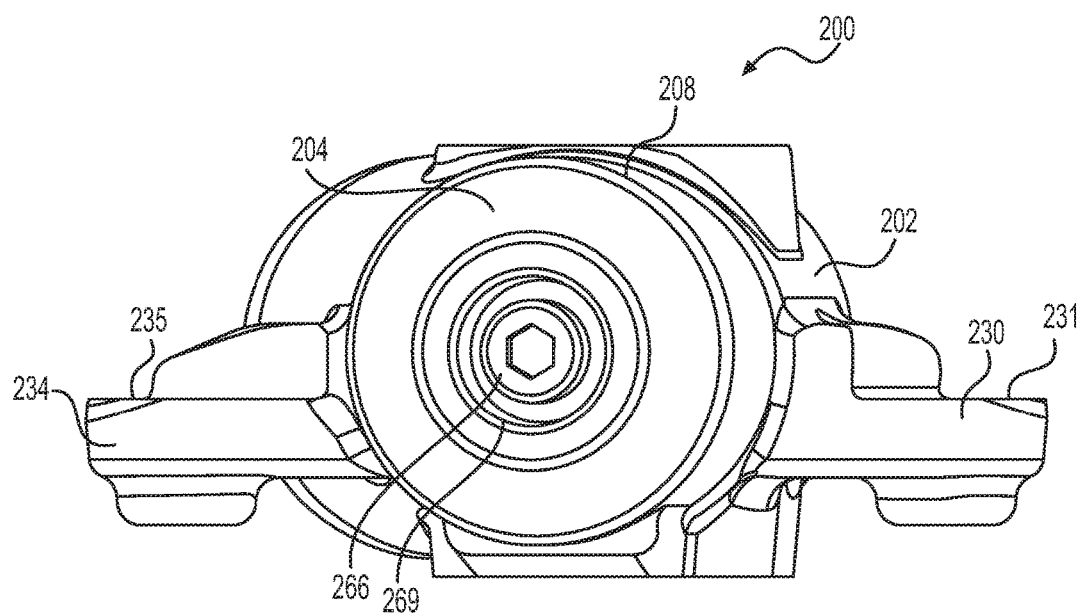
FIG. 19 is a rear elevation view of the left axle holder and left axle adjuster assembly of FIG. 15.
Figure 20:
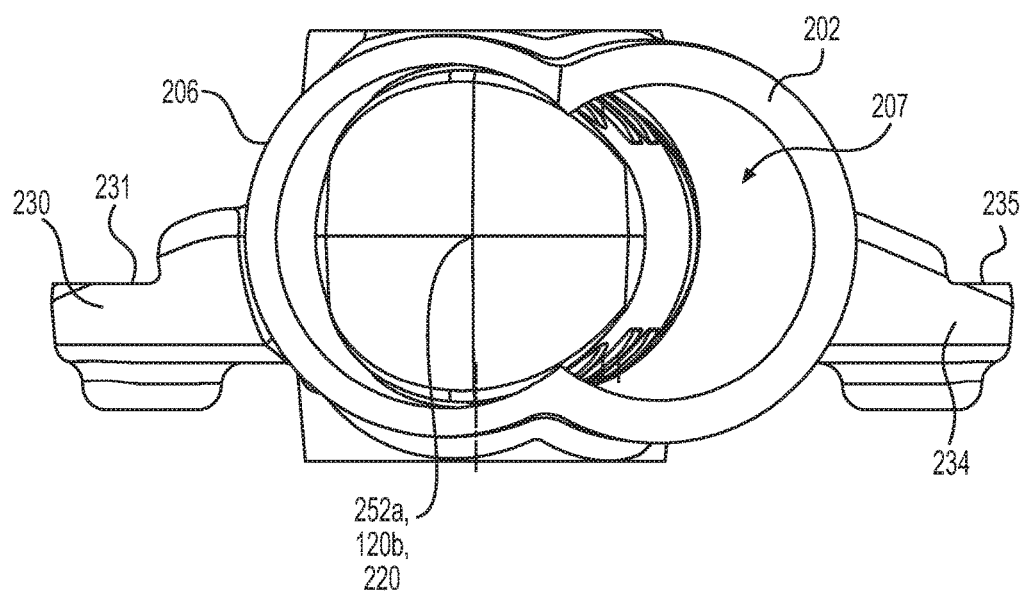
FIG. 20 is a front elevation view of the left axle holder and left axle adjuster assembly of FIG. 15.

As can be seen in FIG. 18, the space 207 enclosed by the axle holder body 202 is an extension of the interior cylindrical spaces enclosed by the upper and lower left tubes 120, 122 at the rear ends 120b, 122b. The space 207 has the shape of two longitudinally extending and overlapping cylinders, the upper one of the cylinders (corresponding to the tube 120) being disposed with its central axis at an angle with respect to the central axis of the lower one (corresponding to the tube 122) of the cylinders.

Figure 15:
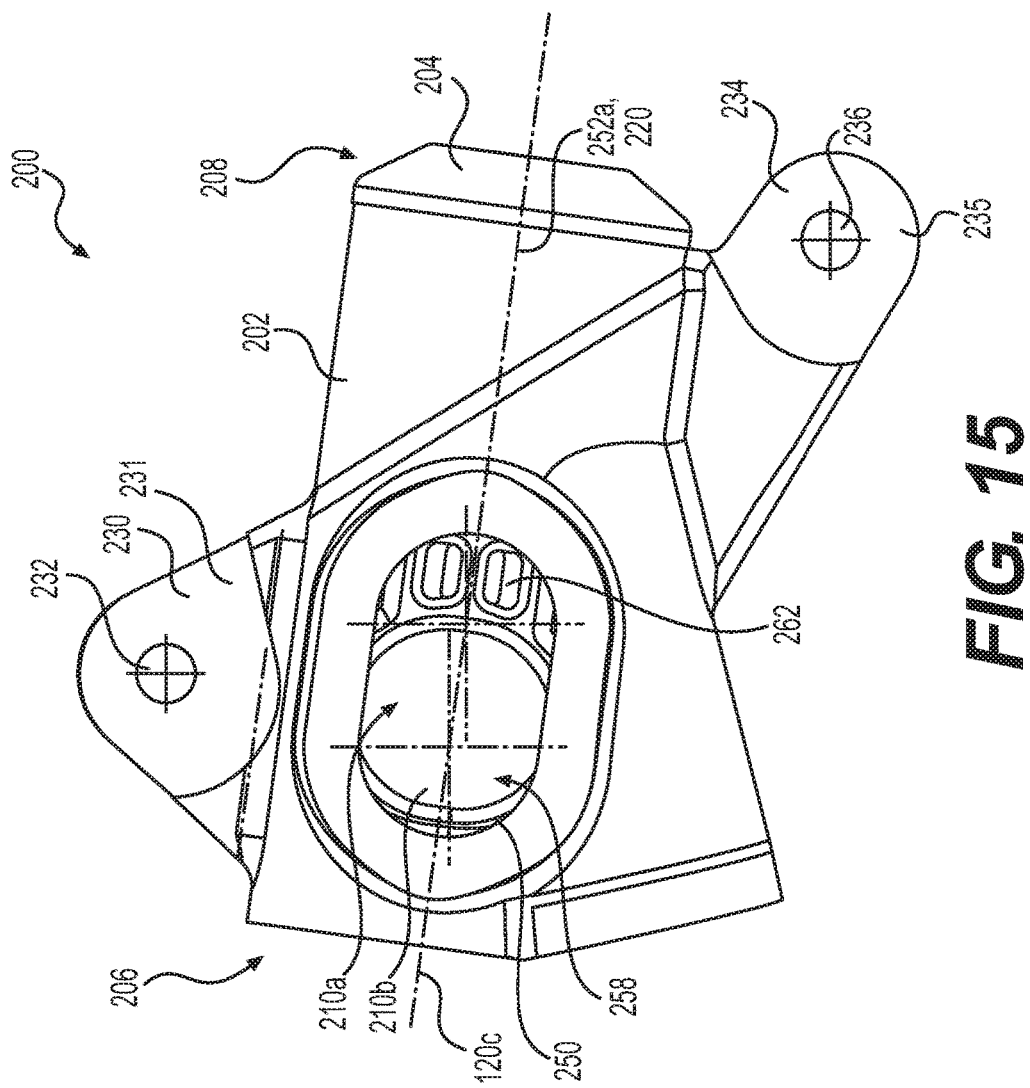
FIG. 15 is a left side elevation view of a left axle holder and left axle adjuster assembly of the swing arm of FIG. 5.
Figure 16:
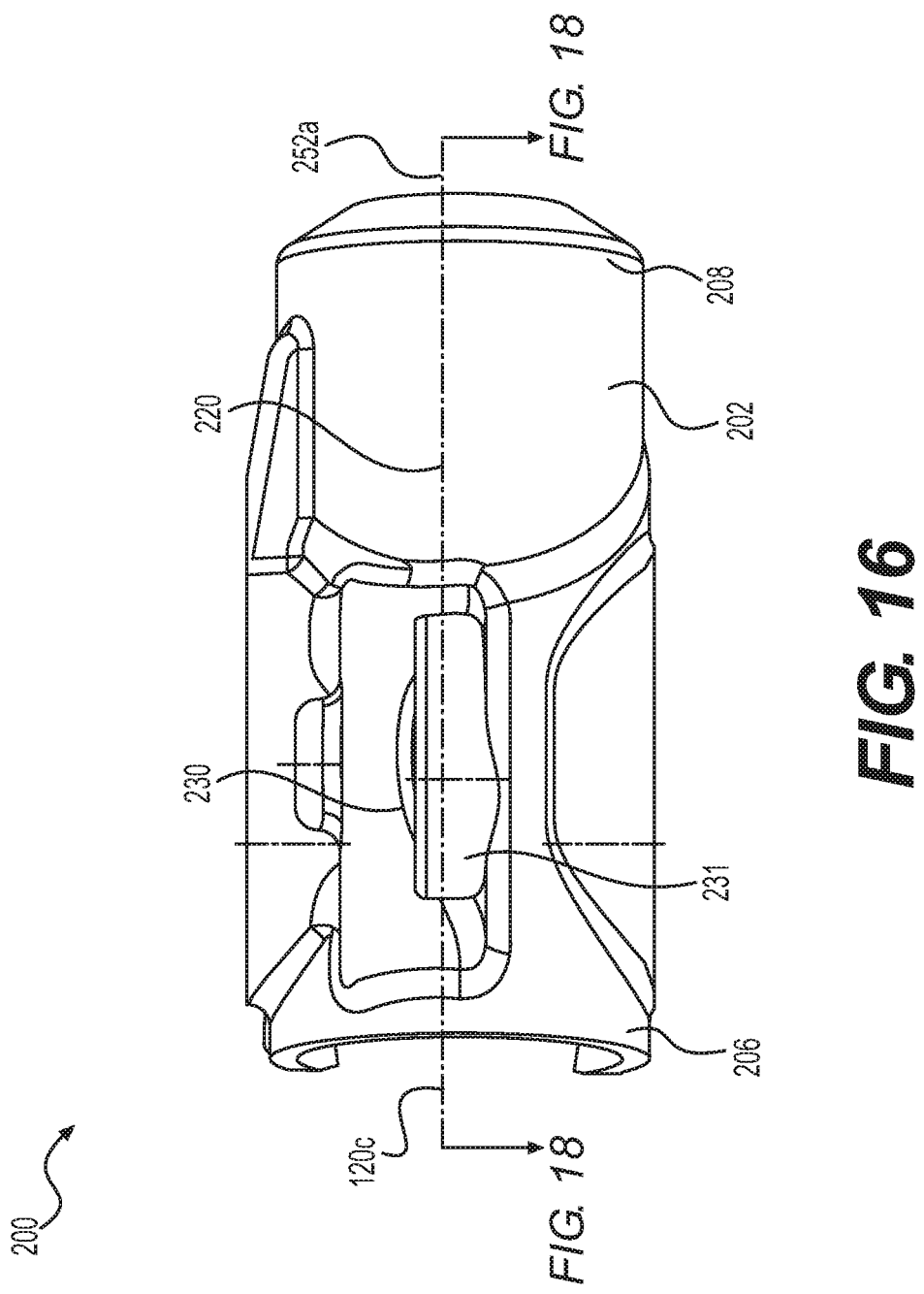
FIG. 16 is a top plan view of the left axle holder and left axle adjuster assembly of FIG. 15.
Figure 17:
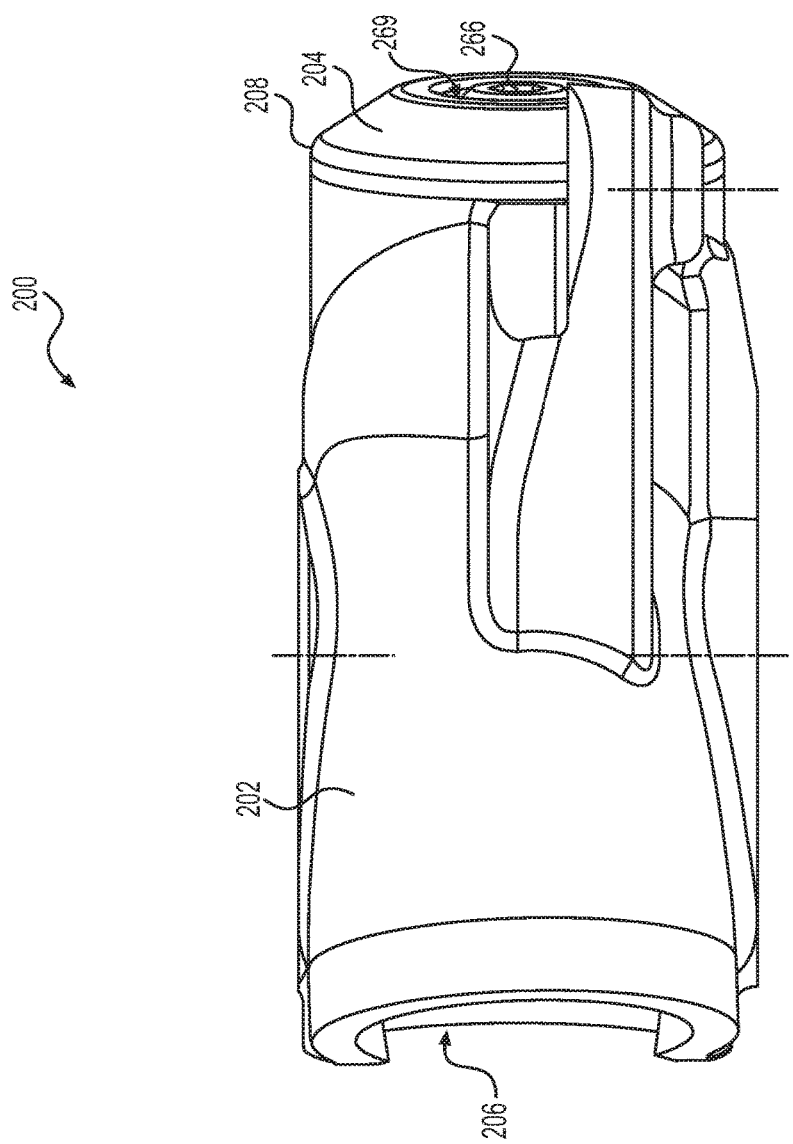
FIG. 17 is a bottom plan view of the left axle holder and left axle adjuster assembly of FIG. 15.

With reference to FIG. 15, the upper portion of the of the axle holder body 202 has an elongated slot 210A defined in the left side wall (laterally outer wall). The right side wall (laterally inner wall) of the axle holder 200 has another elongated slot 210B (the inner or left slot 210A of the right axle holder 200 being shown in the Figures, for example, in FIG. 11). The slots 210A and 210B of the left axle holder 200 are aligned vertically and longitudinally with each other so that the laterally extending rear axle 110 can extend laterally through the aligned slots 210, 210B (and the opening 258 of the axle adjuster 250 which will be described below). The slot 210B is a mirror image of the slot 210A with respect to a vertical plane passing through the axis 120c of the upper left tube 120. As such, only the left slot 210A will be discussed below.

With reference to FIG. 15, the slot 210A is stadium shaped and is elongated in the direction parallel to the central axis 120c of the portion of the upper left tube 120 extending forwardly from the axle holder body 202. In other words, the slot 210A is longer in the direction parallel to the axis 120c than in the direction perpendicular to the axis 120c when viewed from a side as in FIG. 15. It is contemplated that the slots 210A, 210B could be elongated in a direction other than the direction parallel to the axis 120c. A boss is formed of the outer surface of the axle holder body 202 around the slot 210A.

With reference to FIGS. 15 to 17, 19 and 20, an upper tab 230 extends upwardly from the upper surface of the axle holder body 200. The upper tab 230 is triangular and has a through-hole 232. A groove 231 extends into the left surface (laterally outwardly facing surface) of the tab 230 around the through-hole 232. The groove 231 extends to the upper edges of the tab 230. A boss is formed around the through-hole 232 on the right surface (laterally outwardly facing surface) of the tab 230.

With reference to FIGS. 15 to 17, 19 and 20, a lower tab 234 extends downwardly and rearward from the lower surface of the axle holder body 200. The lower tab 234 is disposed longitudinally rearward of the upper tab 230 and has a through-hole 236. A groove 235 extends into the left surface (laterally outer surface) of the tab 230 around the through-hole 236. The groove 235 extends to the lower edges of the tab 234. A boss is formed around the through-hole 236 on the right surface (laterally outwardly facing surface) of the tab 234.

As can be seen in FIGS. 2 to 4, the left side of the fender support 112 is connected to the tabs 230, 234 of the left axle holder 200. Similarly, a right side of the fender support 112 is connected to the tabs 230, 234 of the right axle holder 200. The fender support 112 includes a left upper arm 240 connected to the upper tab 230 and a left lower arm 244 connected to the lower tab 234 of the left axle holder. A left connecting arm 242 extends between the upper and lower left arms 240, 244. The upper and lower left arms extend rearward from the tabs 230, 234 to the fender 26. The rear ends of the left arms 240, 244 are connected to a left side of a bracket 246 on the rear surface of the fender 26. The fender support 112 also includes a right upper arm 240 connected to the upper tab 230 and a right lower arm 244 connected to the lower tab 234 of the right axle holder 200. A right connecting arm 242 extends between the upper and lower right arms 240, 244. The upper and lower right arms 240, 244 extend rearward from their respective tabs 230, 234 to the fender 26. The rear ends of the right arms 244, 246 connect to a right side of the bracket 246 on the rear surface of the fender 26.

As can be seen in FIGS. 15 and 18, an axle adjuster 250 is placed in the space 207 inside the axle holder 200. With reference to FIGS. 20 to 24, the axle adjuster 250 has a generally cylindrical body 252 extending between a front end 254 and a rear end 256, and having a central axis 252a. The axle holder 250 is disposed in the upper portion of the axle holder space 207 coaxially with the upper left tube portion 120 that extends forwardly from the axle holder 200. The body 252 is slidable inside the axle holder 207 in a direction parallel to the axes 120c, 252a.

Figure 21:
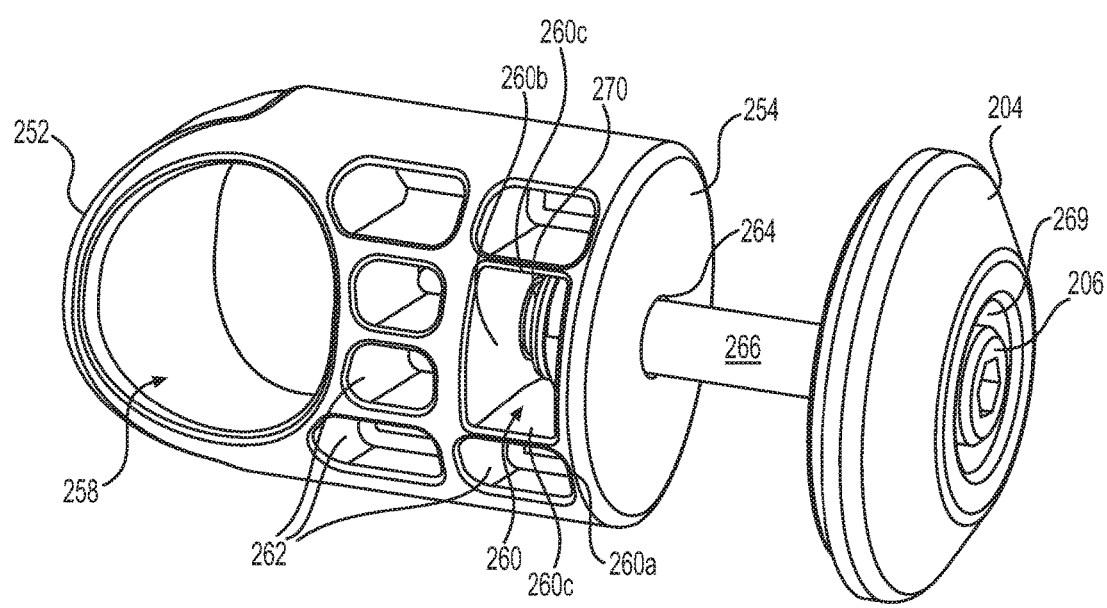
FIG. 21 is a perspective view, taken from a rear left side, of the left axle adjuster assembly and cap of the left axle holder of FIG. 15.
Figure 22:
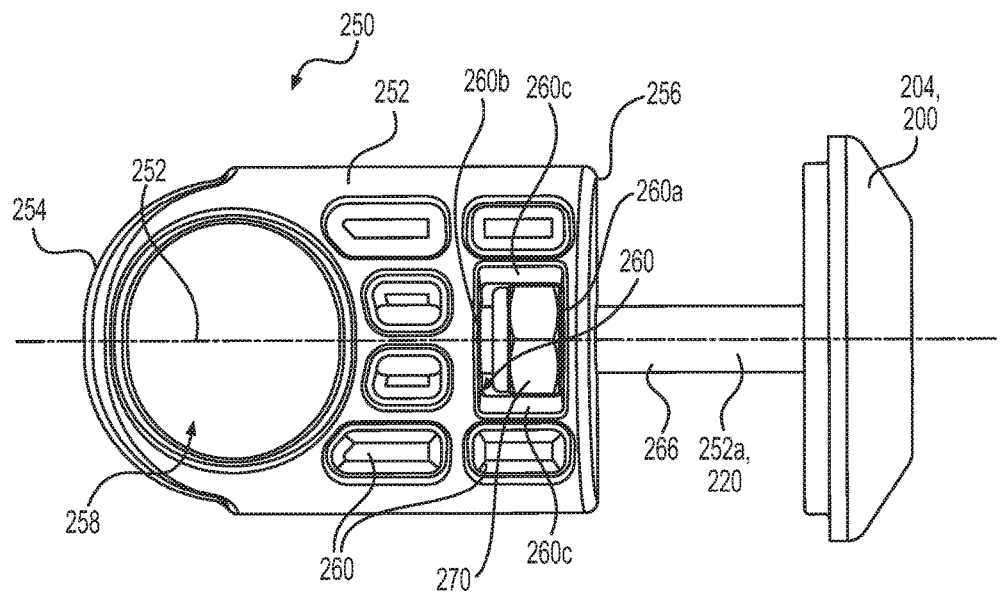
FIG. 22 is a left side elevation view of the left axle adjuster assembly and cap of FIG. 21.
Figure 23:
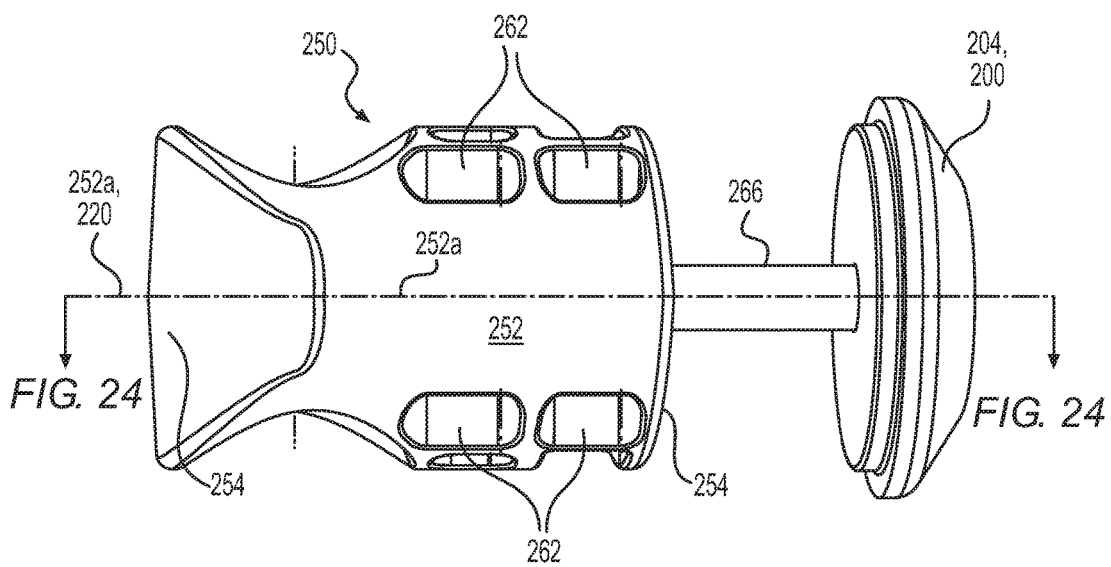
FIG. 23 is a top plan view of the left axle adjuster assembly and cap of FIG. 21.
Figure 24:
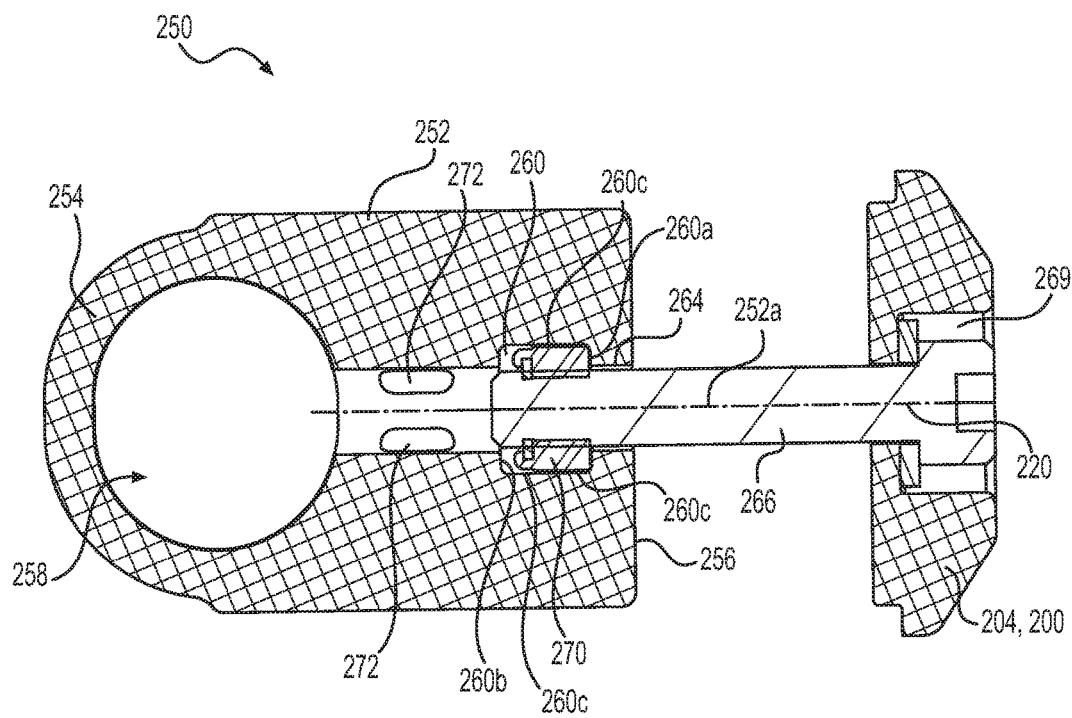
FIG. 24 is a cross-sectional view of the left axle adjuster assembly and cap of FIG. 21, taken along the line 24-24 of FIG. 23.

As can be seen in FIGS. 15, 21 and 22, an opening 258 is formed near the front end 254. The opening 258 extends laterally through the body 252 of the axle adjuster 250. As can be seen in FIGS. 18 and 24, when viewed from a side, the opening 258 is slightly elongated in the direction perpendicular to the axis 252a than in the direction along the axis 220.

As can be seen in FIG. 15, the opening 258 is aligned with the slots 210A, 210B so that the axle 110 can extend laterally therethrough. The slots 210A, 210B are longer than the opening 258 in the direction parallel to the axis 120c, 252a (when viewed from a side). The slots 210A, 210B are slightly smaller than the opening 258 in the direction perpendicular to the axis 120c, 252a (when viewed from a side). The rear axle 110 can therefore slide inside the slots 210A, 210B in the direction parallel to the axes 252a, 120c when the axle adjuster 250 slides in the axle holder 200. The axes 252a, 120c are therefore referred to as the axle adjustment axis. It will be understood that, in general, the axle 110 slides in a direction parallel to an axle adjustment axis that will be determined based on the specific configuration of the axle adjuster 250 and the axle holder 200. Thus, it is contemplated that the axle adjustment axis could not be parallel or coaxial with either one of the axes 120c and 252a. For clarity, the axle adjustment axis will be referred to hereinafter using a different reference number, namely axle adjustment axis 220. An axle adjustment direction is defined as a direction parallel to the axle adjustment axis 220.

As can be seen in FIGS. 21 and 22, another opening 260 extends laterally through the axle adjuster body 252. The opening 260 is disposed between the opening 258 and the rear end 256. When viewed from the side as in FIG. 22, the opening 260 is rectangular and centered with respect to the adjuster axis 252a. The opening 260 has laterally extending walls 260c, a vertically extending front wall 260b, and a vertically extending rear wall 260a that is disposed closer to the rear end 256 than the vertically extending front wall 260b.

With reference to FIGS. 22 and 24, a nut 270 is disposed in the opening 260. The nut is disposed coaxially with the axes 220, 252a, 120c. The nut 270 is a locking type nut. As can be seen in FIG. 24, the dimensions of the opening 260 are configured such that the laterally extending walls 260c of the opening 260 abut the opposite faces of the hexagonal nut 270 limiting rotation of the nut 260 in the opening 270. The front and rear walls 260a, 260b are spaced further apart that the front and rear surfaces of the nut 270 so that the nut can slide for a short distance along the lateral extending wall 260c.

The axle adjuster body 252 has additional recesses 262 to reduce the weight of the axle adjuster 250. The recesses 262 are disposed longitudinally between the opening 258 and the rear end 256. It is contemplated that the recesses 262 could be openings extending through the body 252.

With reference to FIGS. 24 and 18, a cylindrical passage 264 extends into the axle adjuster body 252 from the rear end 256 and coaxially with the axle adjustment axis 220. The passage 264 extends from the rear end 256 to the opening 258 and passes through the opening 260. It is contemplated that the passage 266 could not extend to the opening 258.

The cap 204 has an opening 268 aligned with the passage 264. An axle adjuster bolt 266 is inserted through the opening 268 of the cap 204 into the passage 264. A recess 269 is formed on the rearward facing surface of the cap 204 around the opening 268 to accommodate the head of the bolt 266 and a tool to rotate the bolt 266. The bolt 266 is engaged by the nut 270 as it passes through the portion of the passage 264 coinciding with the opening 260.

When the bolt 266 is rotated in a clockwise direction (as viewed from the rear end 208 of the axle holder 200), the bolt 266 passes forwardly through the nut 270 (towards the front end 206 of the axle holder 200). Once the nut 270 abuts the rear wall 260b of the opening 260, further rotation of the bolt 270 pulls the axle adjuster body 252 rearward towards the cap 204, thereby moving the axle 110 rearward in the slots 201A, 210B and away from the front end 206. The motion of the bolt 266 towards the front end 206 of the axle holder 200 and the motion of the axle adjuster body 252 towards the rear end 208 of the axle holder 200 is limited by an annular stopper 272 placed in the passage 264 between the opening 270 and the opening 258. When the bolt 266 abuts the stopper 272, the axle adjuster 250 cannot be moved further rearward.

When the bolt 266 is rotated in a counter-clockwise direction (as viewed from the rear end 208 of the axle holder 200), the bolt 266 passes rearward through the nut 270 (towards the rear end 208 of the axle holder 200). Once the nut 270 abuts the front wall 260a of the opening 260, further rotation of the bolt 270 slides the axle adjuster body 252 forwardly away from the cap 204, thereby moving the axle 110 forwardly in the slots 201A, 210B toward the front end 206 of the axle holder 200.

It is contemplated that the nut 270 could be omitted and that a portion of the passage 264 could be threaded to engage the bolt 266 for moving the axle adjuster 250 inside the axle holder 200 as described above.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A swing arm for a vehicle comprising:
a left member including at least one left tube extending longitudinally, the at least one left tube comprising an upper left tube and a lower left tube extending longitudinally, the upper and lower left tubes being connected together at least at one of: front end portions of the upper and lower left tubes and rear end portions of the upper and lower left tubes;
a right member including at least one right tube extending longitudinally, the at least one right tube comprising an upper right tube and a lower right tube extending longitudinally, the upper and lower right tubes being connected together at least at one of: front end portions of the upper and lower right tubes and rear end portions of the upper and lower right tubes,
a front portion of the upper left tube and a front portion of the upper right tube being parallel to each other,
respective front end portions of the left and right members being adapted to be pivotably connected to a frame of the vehicle, respective rear end portions of the left and right members being adapted to mount a rear wheel axle;
a cross member extending laterally between the left and right members and comprising:
 a stamped first portion being rigidly connected to at least one of the left and right members; and
 a stamped second portion being rigidly connected to at least the other of the left and right members, the first and second portions being connected to each other and defining a space therebetween; and
a shock absorber mount adapted to connect to one end of a shock absorber, the shock absorber mount being connected to the left and right members and extending laterally therebetween,
the shock absorber mount being disposed longitudinally between the cross member and the rear end portions of the left and right members, and
the shock absorber mount being spaced from the cross member and the rear end portions of the left and right members.

2. The swing arm of claim 1, wherein:
the stamped first portion is an upper portion having a front edge, a rear edge, a left edge connected to the left member and a right edge connected to the right member;
the stamped second portion is a lower portion having a front edge, a rear edge, a left edge connected to the left member and a right edge connected to the right member.

3. The swing arm of claim 2, wherein:
the rear edges of the upper and lower portions are connected to each other; and
the front edges of the upper and lower portions are connected to each other.

4. The swing arm of claim 3, wherein:
a front portion of the upper portion extends upwardly from the front edge of the lower portion; and
a rear portion of the upper portion extends upwardly from the rear edge of the lower portion.

5. The swing arm of claim 3, wherein:
a front portion of the lower portion extends downwardly from the front edge of the upper portion; and
a rear portion of the lower portion extends downwardly from the rear edge of the upper portion.

6. The swing arm of claim 1, wherein:
the left member further comprises a left connection tube connected to the upper and lower left tubes; and
the right member further comprises a right connection tube connected to the upper and lower right tubes.

7. The swing arm of claim 6, wherein:
the left connection tube is disposed longitudinally between the front and rear end portions of the left member; and
the right connection tube is disposed longitudinally between the front and rear end portions of the right member.

8. The swing arm of claim 1, wherein a rear portion of the upper left tube and a rear portion of the upper right tube are parallel to each other, the rear portion of the upper left tube being disposed leftwardly of the front portion of the upper left tube, the rear portion of the upper right tube being disposed rightwardly of the front portion of the upper right tube.

9. The swing arm of claim 1, wherein:
the stamped first portion is an upper portion having a front edge, a rear edge, a left edge being connected to the upper left tube and a right edge being connected to the upper right tube;
the stamped second portion is a lower portion having a front edge, a rear edge, a left edge being connected to the lower left tube and a right edge being connected to the lower right tube.

10. The swing arm of claim 9, wherein:
the rear edges of the upper and lower portions are connected to each other; and
the front edges of the upper and lower portions are connected to each other.

11. The swing arm of claim 9, wherein a connection between the rear edges of the upper and lower portions of the cross member is disposed vertically between the upper left tube and the lower left tube.

12. The swing arm of claim 9, wherein the cross member further comprises:
   a left portion connected to at least one of the upper and lower portions, the left portion having an upper edge connected to the upper left tube and a lower edge connected to the lower left tube; and
   a right portion connected to at least one of the upper and lower portions, the right portion having an upper edge connected to the upper right tube and a lower edge connected to the lower right tube.

13. The swing arm of claim 1, wherein the shock absorber mount comprises:
   a first shock absorber mount member connected to the left and right members and extending laterally therebetween;
   a left shock absorber mount member being connected to the first shock absorber mount member and the left member;
   a right shock absorber mount member being connected to the first shock absorber mount member and the right member; and
   a mounting bracket being adapted to be connected to the one end of the shock absorber and being disposed laterally between the left and right members, the mounting bracket being connected to at least one of: the left and right shock absorber mount members, and the first shock absorber mount member.

14. The swing arm of claim 1, further comprising a brake caliper mounting bracket connected to one of the left and right members, the brake caliper mounting bracket being adapted to be connected to a brake caliper connected to a rear wheel mounted on the rear wheel axle.

15. The swing arm of claim 14, wherein at least one of the at least one left tube and the at least one right tube is adapted to house therein a portion of at least one of:
   a parking brake cable operatively connected to the brake caliper; and
   a brake line operatively connected to the brake caliper.

16. The swing arm of claim 1, further comprising at least one aperture defined in one of:
   the at least one left tube; and
   the at least one right tube,
   the one of the at least one left tube and the at least one right tube being adapted to house at least one element,
   the at least one aperture being configured to receive therethrough the at least one element, and
   each of the at least one element being one of:
      a cable;
      a fluid passage line; and
      a wire.

17. A vehicle comprising:
a frame;
at least one front wheel connected to the frame;
at least one rear wheel connected to the frame;
a rear axle, the at least one rear wheel being mounted to the rear axle;
a motor supported by the frame and operatively connected to at least one of the wheels;
a seat connected to the frame; and
   a swing arm comprising:
   a left member including at least one left tube extending longitudinally, the at least one left tube comprising an upper left tube and a lower left tube extending longitudinally, the upper and lower left tubes being connected together at least at one of: front end portions of the upper and lower left tubes and rear end portions of the upper and lower left tubes;
   a right member including at least one right tube extending longitudinally, the at least one right tube comprising an upper right tube and a lower right tube extending longitudinally, the upper and lower right tubes being connected together at least at one of: front end portions of the upper and lower right tubes and rear end portions of the upper and lower right tubes,
   a front portion of the upper left tube and a front portion of the upper right tube being parallel to each other,
   respective front end portions of the left and right members being pivotably connected to the frame, the rear axle being mounted to respective rear end portions of the left and right members; and
   a cross member extending laterally between the left and right members and comprising:
      a stamped first portion being rigidly connected to at least one of the left and right members; and
      a stamped second portion being rigidly connected to at least the other of the left and right members, the first and second portions being connected to each other and defining a space therebetween.

18. The vehicle of claim 17, further comprising at least one element, the at least one element being one of:
   a cable;
   a fluid passage line; and
   a wire,
the at least one element being housed at least partly in one of:
   the at least one left tube; and
   the at least one right tube.

* * * * *